(12) United States Patent
Liu et al.

(10) Patent No.: US 10,594,179 B2
(45) Date of Patent: Mar. 17, 2020

(54) ALTERNATING FLUX BARRIER AIR GAP IN A SPOKE TYPE MACHINE

(71) Applicant: Wisconsin Alumni Research Foundation, Madison, WI (US)

(72) Inventors: Wenbo Liu, Madison, WI (US); Thomas A. Lipo, Middleton, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 215 days.

(21) Appl. No.: 15/595,063

(22) Filed: May 15, 2017

(65) Prior Publication Data

US 2018/0331591 A1  Nov. 15, 2018

(51) Int. Cl.
*H02K 1/27* (2006.01)
*H02K 21/14* (2006.01)
*H02K 1/16* (2006.01)
*H02K 1/24* (2006.01)

(52) U.S. Cl.
CPC ......... *H02K 1/2786* (2013.01); *H02K 1/2773* (2013.01); *H02K 21/14* (2013.01); *H02K 1/16* (2013.01); *H02K 1/246* (2013.01); *H02K 2213/03* (2013.01)

(58) Field of Classification Search
CPC .. H02K 1/00; H02K 1/14; H02K 1/16; H02K 1/24; H02K 1/246; H02K 1/27; H02K 1/277; H02K 1/2773; H02K 1/278; H02K 1/2786; H02K 1/279; H02K 1/2793; H02K 21/12
See application file for complete search history.

(56) References Cited

U.S. PATENT DOCUMENTS

| | | | |
|---|---|---|---|
| 4,517,478 A | 5/1985 | Oudet | |
| 7,723,888 B2 | 5/2010 | Petek | |
| 9,595,858 B2 | 3/2017 | Lipo et al. | |
| 2006/0273684 A1* | 12/2006 | Ishikawa | H02K 1/278 310/216.004 |
| 2009/0096308 A1* | 4/2009 | Staudenmann | H02K 1/2773 310/156.08 |
| 2014/0084744 A1* | 3/2014 | Nakazono | H02K 1/28 310/216.123 |

OTHER PUBLICATIONS

Du et al., High torque density ferrite permanent magnet vernier motor analysis and design with demagnetization consideration,Energy Conversion Congress and Exposition (ECCE), 2015 IEEE, Sep. 20, 2015, pp. 6082-6089.

(Continued)

*Primary Examiner* — Tran N Nguyen
(74) *Attorney, Agent, or Firm* — Bell & Manning, LLC

(57) ABSTRACT

The rotor includes ribs and permanent magnets mounted as spokes in pole pairs. A second wall of each rotor air gap of a plurality of rotor air gaps is parallel to an edge of a permanent magnet of the permanent magnets. A length of the second wall is less than 80% of a length of the edge. A fifth wall of each rotor air gap of the rotor air gaps is formed by a first side of a rib. Each pair of permanent magnets has an associated pair of rotor air gaps of the rotor air gaps. A first rotor air gap of each pair of rotor air gaps of the rotor air gaps is a mirror image of a second rotor air gap of each pair of rotor air gaps. Each pair of rotor air gaps is separated by an associated rib of the plurality of ribs.

20 Claims, 17 Drawing Sheets

(56) References Cited

OTHER PUBLICATIONS

Qu et al., Relationship between Magnetic Gears and Vernier Machines, 2011 International Conference on Electrical Machines and Systems (ICEMS), Beijing, Aug. 20-23, 2011, pp. 1-6.

Toba et al., Generic Torque-Maximizing Design Methodology of Permanent Magnet Vernier Machine, 1999, IEEE, pp. 522-524.

Toba et al., Novel Dual-Excitation Permanent Magnet Vernier Machine, 1999.

J. Li, Design, analysis and control of permanent-magnet vernier machines, 2012, pp. 1-177.

Kakihata et al., Design of Surface Permanent Magnet-type Vernier Motor, 2012 15th International Conference on Electrical Machines and Systems (ICEMS), Sapporo, Oct. 21-24, 2012, pp. 1-6.

Zhao et al., Magnet Flux Focusing Design of Double Stator Permanent Magnet Vernier Machine, Compumag 2013, Budapest, Hungary, Jun. 30, 2013.

Boughrara et al., Analytical Calculation of Parallel Double Excitation and Spoke-Type Permanent-Magnet Motors; Simplified Versus Exact Model, Progress in Electromagnetics Research B, vol. 47, 2013, pp. 145-178.

Li et al., High-Power-Factor Vernier Permanent-Magnet Machines, IEEE Trans. Ind. Appl., vol. 50, No. 6, Nov. 2014, pp. 3664-3674.

Kim et al., Operation and Design Principles of a PM Vernier Motor, IEEE Trans. Ind. Appl., vol. 50, No. 6, Nov. 2014, pp. 3656-3663.

Zhao et al., A Novel Dual-Stator Axial-Flux Spoke-Type Permanent Magnet Vernier Machine for Direct-Drive Applications, IEEE Transactions on Magnetics, vol. 50, No. 11, Nov. 2014.

Zhang et al., A Novel Triple-Rotor Axial-Flux Vernier Permanent Magnet Machine, IEEE Transactions on Applied Superconductivity, vol. 26, No. 7, Oct. 2016.

Zou et al., Analysis of a Dual-Rotor, Toroidal-Winding, Axial-Flux Vernier Permanent Magnet Machine, DOI 10.1109/TIA.2017. 2657493, IEEE Transactions on Industry Applications, Jan. 24, 2017.

Ge et al., A Spoke-Type IPM Machine With Novel Alternate Airspace Barriers and Reduction of Unipolar Leakage Flux by Step-Staggered Rotor, IEEE Transactions on Industry Applications, vol. 52, No. 6, Nov. 2016, pp. 4789-4797.

Ge et al., A Spoke-Type IPM Machine With Novel Alternate Airspace Barriers and Reduction of Unipolar Leakage Flux by Step-Staggered Rotor, 2015 IEEE Electric Machines & Drives Conference, May 10, 2015.

* cited by examiner

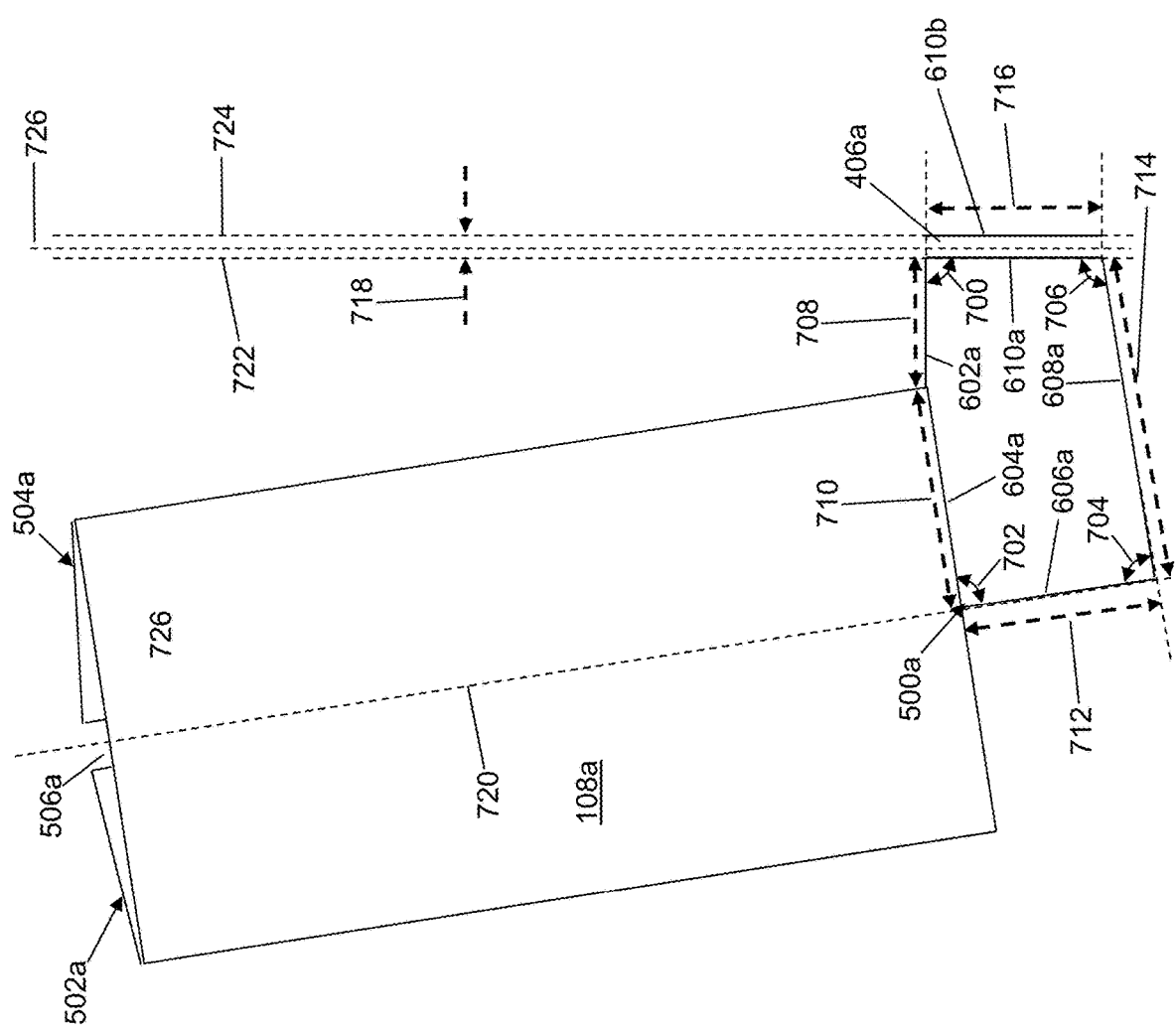

ALTERNATING FLUX BARRIER AIR GAP IN A SPOKE TYPE MACHINE

BACKGROUND

The Vernier machine (VM) was first introduced as a synchronous reluctance motor variant less than 60 years ago and a permanent magnet version of this type of machine appeared only a little more than 20 years ago. In this type of machine, the rotor rotates relatively slowly, and only at a definite fraction of the angular velocity of the stator rotating field. Meanwhile, the motor torque steps up as the rotor speed steps down with this type of operation. This so-called electric gearing effect makes the VM an attractive alternative for direct-drive applications and is especially suitable for low speed motoring/braking operation. However, current designs of the Vernier permanent magnet machine (VPPM) have low power factor because the permanent magnets added to the rotor create additional harmonic flux leakage in the air gap.

To further increase torque density and cope with the low power factor feature of VPPMs, researchers have proposed two major designs of double air gap VPPMs in terms of machine structure: 1) a double rotor Vernier permanent magnet machine (DRVPPM), and 2) a dual stator Vernier permanent magnet machine (DSVPPM). It has been shown that torque improvement and copper loss reduction are achieved by the adaption of the double rotor structure, while the DSVPPM further improves both torque density and power factor with a dual stator spoke array VPPM topology. Unlike conventional single stator and rotor topology, however, introduction of an additional layer of rotor in DRVPPM or an additional layer of stator in DSVPPM significantly increases the machine manufacturing complexity, and poses a challenge to the mechanical structural integrity as well. A thermal issue becomes another concern because the inner stator is enclosed by rotating parts which limit the cooling options for windings positioned in that area.

SUMMARY

In an example embodiment, a rotor is provided. The rotor includes, but is not limited to, a first rotor core, a plurality of ribs, a plurality of rotor core teeth, a second rotor core, and a plurality of permanent magnets. The plurality of ribs each extend from the first rotor core. The plurality of rotor core teeth each extend from the first rotor core. A plurality of rotor air gaps are formed in the first rotor core between a rib of the plurality of ribs and a tooth of the plurality of rotor core teeth. The second rotor core extends from the plurality of ribs, from the plurality of rotor core teeth, and from a first wall of each rotor air gap of the plurality of rotor air gaps. The plurality of permanent magnets are mounted as spokes in pole pairs within the second rotor core. The second wall of each rotor air gap of the plurality of rotor air gaps is formed by a portion of an edge of a permanent magnet of the plurality of permanent magnets. A length of the portion of the edge is less than 80% of a length of the edge. A third wall of each rotor air gap of the plurality of rotor air gaps is formed by a first side of a tooth of the plurality of rotor core teeth. A fourth wall of each rotor air gap of the plurality of rotor air gaps is formed by the first rotor core. A fifth wall of each rotor air gap of the plurality of rotor air gaps is formed by a first side of a rib of the plurality of ribs. The first wall is connected between the second wall and the fifth wall. The third wall is connected between the second wall and the fourth wall. The fourth wall is connected between the third wall and the fifth wall. Each pair of permanent magnets of the plurality of permanent magnets has an associated pair of rotor air gaps of the plurality of rotor air gaps. A first rotor air gap of each pair of rotor air gaps of the plurality of rotor air gaps is a mirror image of a second rotor air gap of each pair of rotor air gaps of the plurality of rotor air gaps. Each pair of rotor air gaps of the plurality of rotor air gaps is separated by an associated rib of the plurality of ribs.

In another example embodiment, a rotor is provided. The rotor includes, but is not limited to, a first rotor core, a plurality of ribs, a plurality of rotor core teeth, a second rotor core, and a plurality of permanent magnets. The plurality of ribs each extend from the first rotor core. The plurality of rotor core teeth each extend from the first rotor core. A plurality of rotor air gaps are formed in the first rotor core between a rib of the plurality of ribs and a tooth of the plurality of rotor core teeth. The second rotor core extends from the plurality of ribs, from the plurality of rotor core teeth, and from a first wall of each rotor air gap of the plurality of rotor air gaps. The plurality of permanent magnets are mounted as spokes in pole pairs within the second rotor core. The second wall of each rotor air gap of the plurality of rotor air gaps is parallel to an edge of a permanent magnet of the plurality of permanent magnets. A length of the second wall is less than 80% of a length of the edge. A third wall of each rotor air gap of the plurality of rotor air gaps is formed by a first side of a tooth of the plurality of rotor core teeth. A fourth wall of each rotor air gap of the plurality of rotor air gaps is formed by the first rotor core. A fifth wall of each rotor air gap of the plurality of rotor air gaps is formed by a first side of a rib of the plurality of ribs. The first wall is connected between the second wall and the fifth wall. The third wall is connected between the second wall and the fourth wall. The fourth wall is connected between the third wall and the fifth wall. Each pair of permanent magnets of the plurality of permanent magnets has an associated pair of rotor air gaps of the plurality of rotor air gaps. A first rotor air gap of each pair of rotor air gaps of the plurality of rotor air gaps is a mirror image of a second rotor air gap of each pair of rotor air gaps of the plurality of rotor air gaps. Each pair of rotor air gaps of the plurality of rotor air gaps is separated by an associated rib of the plurality of ribs.

In yet another example embodiment, an electric machine is provided. The electric machine includes, but is not limited to, the rotor, the plurality of permanent magnets, a stator, and a stator winding. The stator includes, but is not limited to, a plurality of slots and a plurality of teeth. A slot of the plurality of slots is positioned between a pair of the plurality of teeth. The stator is mounted on a first side of the rotor separated by an air gap between a surface of the second rotor core and a tooth of the plurality of teeth. The stator winding is wound about the stator to form a number of poles between a set of terminals.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 7 depicts an air gap and permanent magnet of the rotor of the radial, spoke type, VPPM of FIG. 4 in accordance with an illustrative embodiment.

DETAILED DESCRIPTION

A Vernier permanent magnet (PM) machine (VPPM) is an electromechanical device wherein a number of rotor magnetic poles pairs is much greater than a number of stator winding magnetic pole pairs rather than equal to the number of stator winding pole pairs as in a conventional PM machine. Though the number of stator and rotor poles is unequal, the machine achieves smooth torque by synchronizing the space harmonics of the stator magneto-motive force (MMF) with the MMF of the rotor magnets modulated by the stator teeth.

The increase in torque over a conventional PM machine results because two components of torque are produced in a VPPM rather than one component as in a conventional PM machine. The first component is the normal synchronous reaction torque produced by the magnets and the fundamental component of the stator MMF in which the MMF rotates at synchronous speed defined by the pole pitch of the stator winding (synchronous speed is determined by the stator and rotor pole number combinations). An additional component is produced by the reluctance torque produced by the magnets and the fundamental slot harmonic component of MMF in which this MMF component rotates at a higher synchronous speed than that defined by the coil pitch of the stator winding (reluctance torque is produced by the stator MMF and rotor reluctance caused by rotor saliency, and these two rotates at the same speed of rotor rotating speed). As understood by a person of skill in the art, the PMVM may be used as a generator or as a motor.

Figure 1:
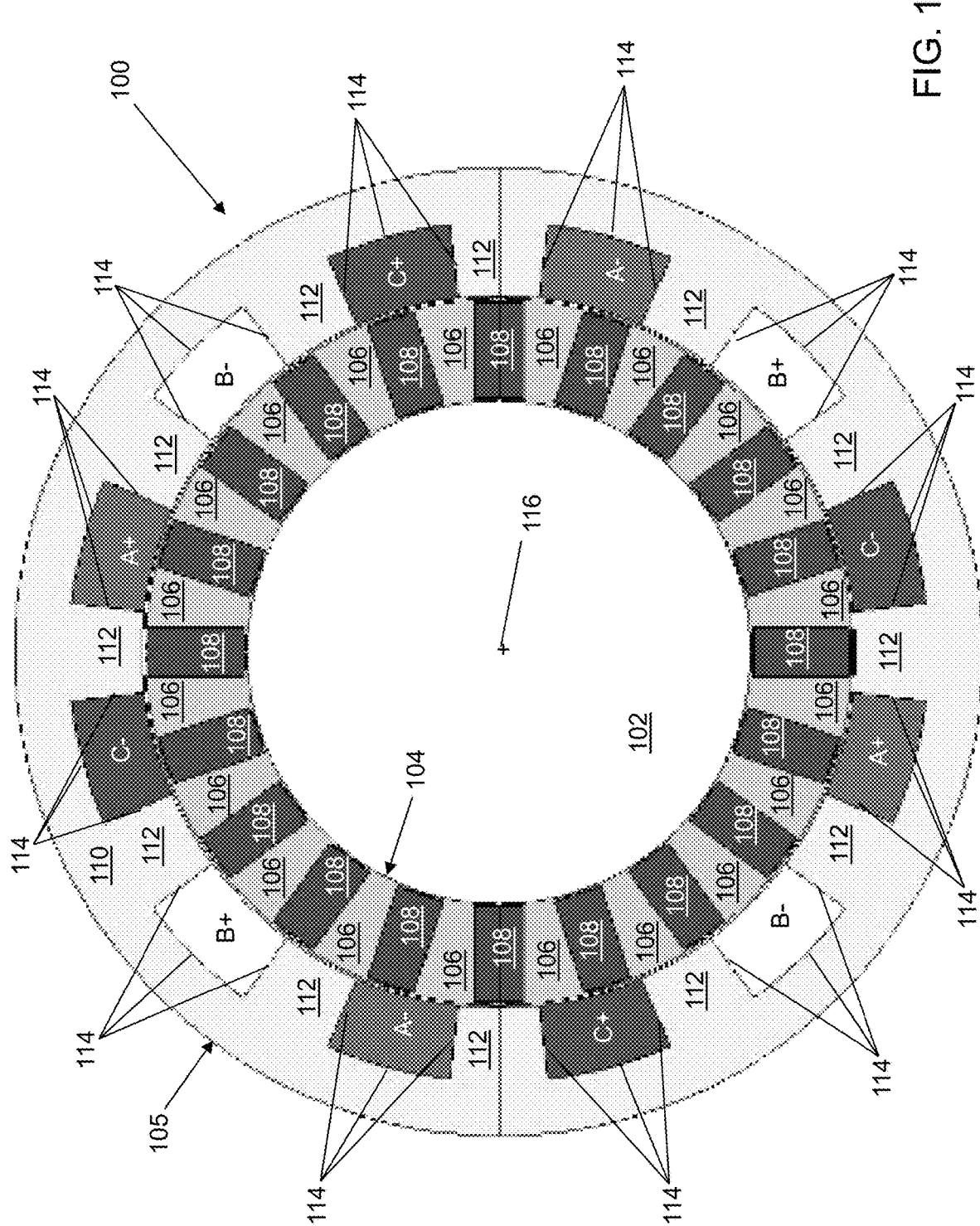
FIG. 1 depicts a radial, spoke type, Vernier permanent magnet machine (VPPM) with a stator and a rotor positioned radially adjacent to each other in accordance with an illustrative embodiment.

The VPPM functions similar to an electric gear in which rotor torque is produced at a different frequency from a rotating frequency of the rotor. Since the rotor flux is spatially modulated by a pulsating toothed stator permeance, the operating principle is analogous to frequency modulation in communication theory. To illustrate the magnetic field spatial modulation, a radial, spoke type VPPM 100 is shown in FIG. 1 where a counter-clockwise direction represents a positive angle notation. A rotating MMF is setup at an excitation frequency where a corresponding analytical form of the MMF is described in equation (1) below where $k_h$ is an hth harmonic winding factor, $N_t$ is a total number of turns, $I_{pk}$ is a stator peak current, $C_p$ is a number of parallel circuits, $P_s$ is a number of stator poles, $\theta_s$ is a stator MMF spatial angle 208 (shown referring to FIG. 2), and $\gamma$ is a current phase shift angle. An air gap permeance $p_g$ due to a stator pulsating tooth is described by equation (2), where $p_0$ and $p_h$ are a DC and an hth harmonic component of permeance and $S_s$ is a number of stator slots. A rotor PM MMF $F_{pmg}$ can be defined using equation (3), where $F_{pmgh}$ is an hth harmonic component of the PM MMF, $P_r$ is a number of rotor poles, and $\theta_r$ is a rotor PM MMF spatial angle 210 (shown referring to FIG. 2). Consequently, a rotor flux density modulation effect from a product of the rotor PM MMF $F_{pmg}$ and air gap permeance $p_g$ can be computed. A fundamental component is defined in equation (4), where $$c_1 = F_{pmg1} \frac{p_1}{2} \text{ and } c_0 = F_{pmg1} \frac{p_0}{2}.$$

$$F_{sg} = \sum_{h=1,5,7,11 \ldots} \left(\frac{3}{2} \cdot \frac{4}{\pi}\right) \frac{k_h N_t I_{pk}}{h C_p P_s} \cos\left(h \frac{P_s}{2} \theta_s \mp (\omega_e t - \gamma)\right) \quad (1)$$

$$p_g = p_0 + p_h \sum_{h=1,5,7,11 \ldots} \cos(h S_s \theta_s) \quad (2)$$

$$F_{pmg} = F_{pmgh} \sum_{h=1,5,7,11 \ldots} \cos\left(h \frac{P_r}{2} \theta_r\right) \quad (3)$$

$$B_{rg} = c_1 \cos\left(\frac{P_r}{2}\theta_r - S_s\theta_s\right) + c_0 \cos\left(\frac{P_r}{2}\theta_r\right) + c_1 \cos\left(\frac{P_r}{2}\theta_r + S_s\theta_s\right) \quad (4)$$

Figure 2:
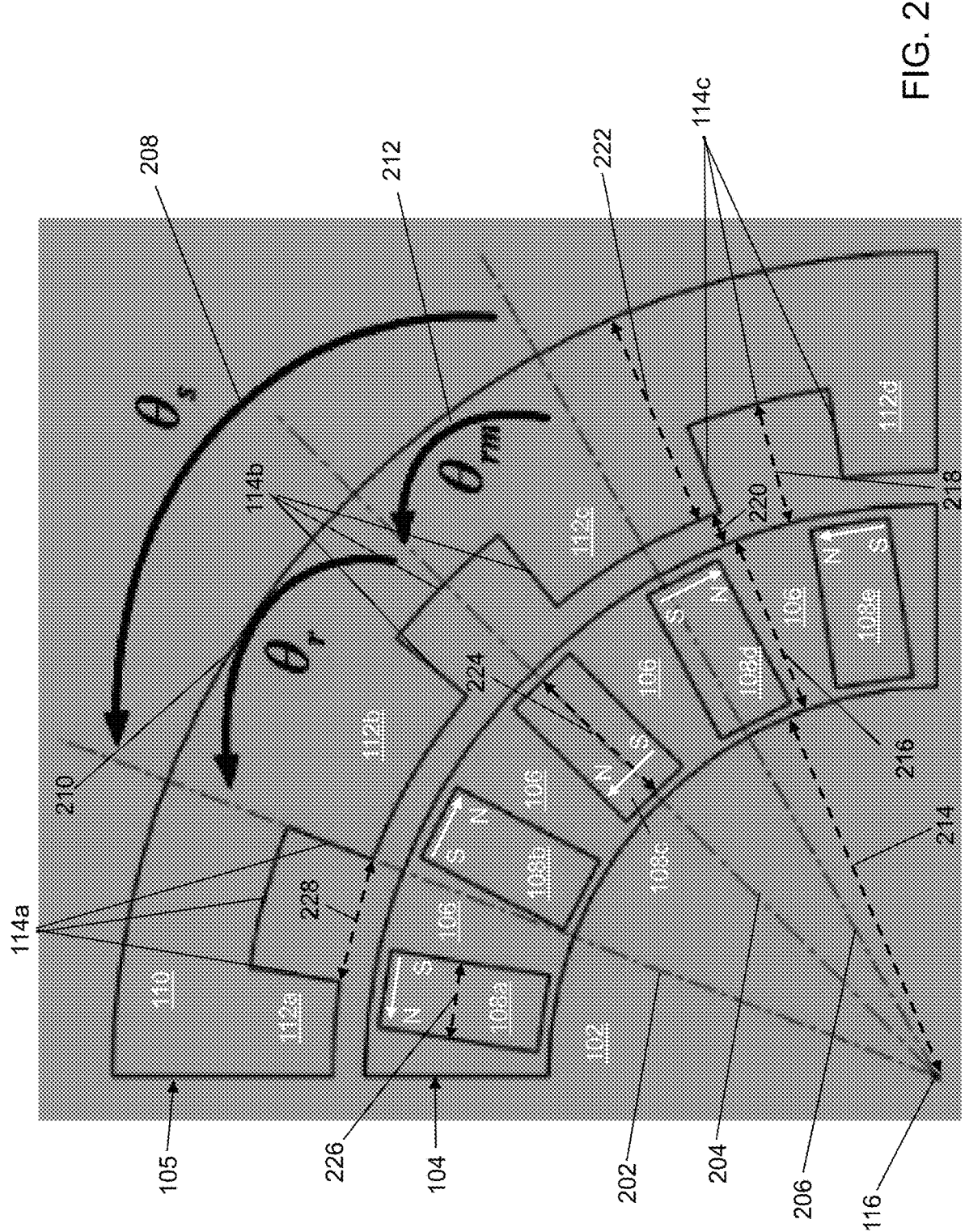
FIG. 2 depicts a zoomed portion of the radial, spoke type, VPPM of FIG. 1 in accordance with an illustrative embodiment.

The rotor torque can then be expressed as the rate of change of the field energy stored in the air gap as:

$$T = \frac{\partial}{\partial \theta_{rm}} \left[ \int_{V_{gap}} B_{gap} H_{gap} dV_{gap} \right] \approx \frac{d_{iS} l_i}{2} \int_0^{2\pi} \left( \frac{\partial}{\partial \theta_{rm}} B_{rg} \right) F_{Sg} d\theta_s \quad (5)$$

where $B_{gap}$ is an air gap flux density, $H_{gap}$ is a magnetic field intensity, $H_{gap}$ is a volume, $d_{iS}$ is an inner stator radius, and $l_i$ is a stack length. After substituting $\theta_r = \theta_s - \theta_{rm}$ to $B_{rg}$ in equation (5), the integration becomes that shown in equation (6)

$$T = \frac{3 d_{iS} l_i}{2\pi} \frac{N_t I_{pk} P_r}{C_p P_s} \int_0^{2\pi} \left\{ \sum_{h=1,5,7,11,\ldots} \frac{k_h}{h} \right.$$
$$\cos\left(h \frac{P_s}{2} \theta_s \mp (\omega_e t - \gamma)\right) \left[ c_1 \sin\left(\left(\frac{P_r}{2} - S_s\right)\theta_s - \frac{P_r}{2}\theta_{rm}\right) + \right.$$
$$\left. c_0 \sin\left(\frac{P_r}{2}(\theta_s - \theta_{rm})\right) + c_1 \sin\left(\left(\frac{P_r}{2} + S_s\right)\theta_s - \frac{P_r}{2}\theta_{rm}\right) \right] \right\} d\theta_s \quad (6)$$

where $\theta_{rm}$ is a relative spatial angle 212 (shown referring to FIG. 2).

To fully utilize all three rotor fields for torque generation, it is desired to couple them with as many low order stator MMFs as possible. The trigonometric terms within the integration of equation (6) need to satisfy the condition that the fundamental spatial frequency of stator MMF equals that of the first term of $B_{rg}$ as shown in equation (7)

$$\frac{P_r}{2} = \pm \frac{P_s}{2} + S_s \quad (7)$$

where '+' and '−' can both result in the same stator spatial MMF. The other two terms in $B_{rg}$ can be uniquely determined to couple with the specific stator MMF harmonics for a given number of stator poles $P_s$ as shown in equations (8a)-(8f):

$$-h\frac{P_s}{2} = \frac{P_r}{2} - S_s, \; h = 1 \quad (8a)$$

$$h\frac{P_s}{2} = \frac{P_r}{2} - S_s, \; h = 5 \quad (8b)$$

$$h\frac{P_s}{2} = \frac{P_r}{2} + S_s, \; h = 11 \quad (8c)$$

$$h\frac{P_s}{2} = \frac{P_r}{2} - S_s, \; h = 1 \quad (8d)$$

$$h\frac{P_s}{2} = \frac{P_r}{2} - S_s, \; h = 7 \quad (8e)$$

$$h\frac{P_s}{2} = \frac{P_r}{2} + S_s, \; h = 13 \quad (8f)$$

If equations (8a)-(8f) and $$c_1 = F_{pmg1} \frac{p_1}{2} \text{ and } c_0 = F_{pmg1} \frac{p_0}{2}$$

are substituted into equation (6) $T_{\mp}$ a corresponding torque can be defined as:

$$T_- = \frac{3 d_{iS} l_i}{4\pi} \frac{N_t I_{pk} P_r}{C_p P_s} \quad (9)$$
$$F_{pmg1} \left( p_1 \frac{k_1}{1} + p_0 \frac{k_5}{5} + p_1 \frac{k_{11}}{11} \right) \sin\left(\gamma - \left(\frac{P_r}{2}\theta_{rm} + \omega_e t\right)\right),$$
if $P_r = 2S_s - P_s$ and $$T_+ = \frac{3 d_{iS} l_i}{4\pi} \frac{N_t I_{pk} P_r}{C_p P_s}$$
$$F_{pmg1} \left( p_1 \frac{k_1}{1} + p_0 \frac{k_7}{7} + p_1 \frac{k_{13}}{13} \right) \sin\left((\omega_e t - \frac{P_r}{2}\theta_{rm}) - \gamma\right),$$
if $P_r = 2S_s + P_s$ The oscillating sine term in equation (9) can be set to constant if $\theta_{rm} = \mp 2\omega_e t / P_r$, a mechanical rotor speed can be derived as $$\omega_{rm} = \frac{\partial \theta_{rm}}{\partial t} = \mp 2\omega_e / P_r,$$

suggesting that the rotor speed is inversely proportional to the number of rotor pole pairs $P_r$. A primitive quantitative comparison can be carried out based on equation (9) to obtain a general sense about which sign should be chosen in equation (7). Assuming the current phase shift angle $\gamma$ is tuned to unity, the trigonometric term operates at a maximum per ampere (MTPA) point for both cases for a given size and stator excitation VPM. If one further assumes am ideal full pitched concentrated winding without skew and slots effects, the winding factor diminishes to unity with a three phase machine, $S_s = 3P_s$. If $P_r = 2S_s \pm P_s$ is substituted into $T_{\mp}$, the torque ratio of the two is defined as shown in equation (10):

$$\frac{T_+}{T_-} = \frac{7 F_{pmg1} \left( p_1 \frac{14}{13} + p_0 \frac{1}{7} \right)}{5 F_{pmg1} \left( p_1 \frac{12}{11} + p_0 \frac{1}{5} \right)} \quad (10)$$

Usually $F_{pmg1}$ in a design in which $P_r = 2S_s + P_s$ is greater or equal to that in $P_r = 2S_s - P_s$. Assuming $$p_0 = p_1, \frac{T_+}{T_-} \geq 1.32$$

is obtained, which indicates that ideally a $P_r = 2S_s + P_s$ design produces 32% more torque compared to a $P_r = 2S_s - P_s$ design with only a rotor pole number difference. Regardless of choice of the rotor pole number $P_r$ between the two cases, the term $P_r / P_s$ reveals a gear effect from the VPPM 100.

Referring to FIG. 1, radial, spoke type VPPM 100 is shown in accordance with an illustrative embodiment. Radial, spoke type VPPM 100 may include a shaft 102, a rotor 104, and a stator 105 positioned radially adjacent to each other. In the illustrative embodiment of FIG. 1, rotor 104 is mounted to shaft 102 interior of stator 105. Shaft 102, rotor 104, and stator 105 have generally circular cross sections as shown with reference to FIG. 1. Rotor 104 is mounted to shaft 102 for rotation with shaft 102.

As used in this disclosure, the term "mount" includes join, unite, connect, couple, associate, insert, hang, hold, affix, attach, fasten, bind, paste, secure, bolt, screw, rivet, solder, weld, glue, adhere, form over, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Stator 105 may be formed of a ferromagnetic material such as iron, cobalt, nickel, etc. Stator 105 may include a stator core 110 and a plurality of teeth 112. The plurality of teeth 112 extend from stator core 110 towards a center 116 of an interior of shaft 102, rotor 104, and stator 105. A plurality of slot walls 114 define edges of the stator slots. A slot is positioned between a pair of the plurality of teeth 112. In the illustrative embodiment, the plurality of teeth 112 of stator 105 includes 12 teeth that define 12 stator slots $S_s=12$. As understood by a person of skill in the art, stator 105 may be formed of laminations mounted closely together in an axial direction.

In the illustrative embodiment, radial, spoke type VPPM 100 is a three-phase machine, $N_{ph}=3$, with windings that are connected to provide three-phases, A, B, and C. The windings (not shown) are wound within the plurality of slot walls 114 as understood by a person of skill in the art. The windings are wound about stator 105 to form a number of poles $P_s$ between a set of terminals (not shown). In an illustrative embodiment, the windings are concentrated windings since the power factor has been determined to be inversely proportional to the slots per pole per phase q of stator 105. As understood by a person of skill in the art, using concentrated windings, q is fractional and strictly less than 1. $S_s$ then becomes a dependent variable to the number of stator poles i.e. $S_s=3P_s$. A stator tooth pitch and a back iron height are chosen to sustain a certain amount of flux under a rated current operation by not compromising a slot area to achieve a reasonable current density. For further details, see B. Kim and T. A. Lipo, "Operation and Design Principles of a PM Vernier Motor," *IEEE Trans. Ind. Appl.*, vol. 50, no. 6, pp. 3656-3663, November 2014. In the illustrative embodiment of FIG. 1, radial, spoke type VPPM 100 has four stator poles $P_s=S_s/N_{ph}$.

Rotor 104 may be formed of a ferromagnetic material such as iron, cobalt, nickel, etc. Rotor 104 may include a rotor core 106 and a plurality of permanent magnets 108 mounted radially as spokes within rotor core 106. As understood by a person of skill in the art, rotor core 106 may be formed of laminations mounted closely together in the axial direction. The plurality of permanent magnets 108 are electrically isolated from each other. Openings are formed in rotor core 106 that are sized and shaped to hold the plurality of permanent magnets 108. Each permanent magnet of the plurality of permanent magnets 108 is magnetized to form a south pole on a first side and a north pole on a second side opposite the first side. The plurality of permanent magnets 108 are mounted with N poles adjacent N poles and S poles adjacent S poles to form pole pairs. For illustration referring to FIG. 2, a first permanent magnet 108a and a second permanent magnet 108b form a first pole pair with the arrows pointing from the S pole to the N pole. The pole pairs are formed at a regular pitch circumferentially around rotor 104.

Each permanent magnet of the plurality of permanent magnets 108 may be identical (though mounted with an opposing magnetization direction for adjacent magnets) and may be formed of rare earth magnets, such as neodymium and dysprosium, of ferrite based magnets, etc. Referring to FIG. 2, each permanent magnet of the plurality of permanent magnets 108 has a height 224 that extends radially across rotor 104 and a width 226 that extends perpendicular to height 224. Each permanent magnet of the plurality of permanent magnets 108 has a depth (not shown) that extends in an axial direction perpendicular to height 224 and to width 226.

Referring to FIG. 2, a quarter portion of radial, spoke type VPPM 100 is shown in accordance with an illustrative embodiment. First slot walls 114a define a first slot between a first tooth 112a and a second tooth 112b of the plurality of teeth 112. Second slot walls 114b define a second slot between a second tooth 112b and a third tooth 112c of the plurality of teeth 112. Third slot walls 114c define a third slot between third tooth 112c and a fourth tooth 112d of the plurality of teeth 112. The plurality of teeth 112 may be straight-sided or may be angled, for example, radially toward center 116 of radial, spoke type VPPM 100. The plurality of permanent magnets 108 include a first PM 108a, a second PM 108b, a third PM 108c, a fourth PM 108d, and a fifth PM 108d.

A first radial line 202 extends from center 116 parallel to a first slot wall of first slot walls 114a on a left edge of second tooth 112b. A second radial line 204 extends from center 116 through a center of a second slot wall of second slot walls 114b between a right edge of second tooth 112b and a left edge of third tooth 112c. A third radial line 206 extends from center 116 through a center of third tooth 112c. Stator spatial angle 208, $\theta_s$, is defined between first radial line 202 and third radial line 206. Rotor spatial angle 210, $\theta_r$, is defined between first radial line 202 and second radial line 204. Relative spatial angle 212, $\theta_{rm}$, is defined between second radial line 204 and third radial line 206.

A first radial distance 214 defines a radius of shaft 102. Rotor 104 has a radial width 216. A second radial distance 216 defines a radius of shaft 102. A third radial distance 218 defines a first air gap width between an outer radial surface of rotor 104 and a slot of the plurality of slots of stator 105. A fourth radial distance 220 defines a second air gap width between the outer radial surface of rotor 104 and a tooth of the plurality of teeth 112 of stator 105. A fifth radial distance 220 defines a width of stator 105 at each tooth of the plurality of teeth 112 of stator 105. A slot width 228 defines a width across each slot of stator 105. Rotor 104 and stator 105 are separated by an air gap that has a varying width between rotor 104 and stator 105 due to the changing height between the plurality of slots and the plurality of teeth 111.

Figure 3:
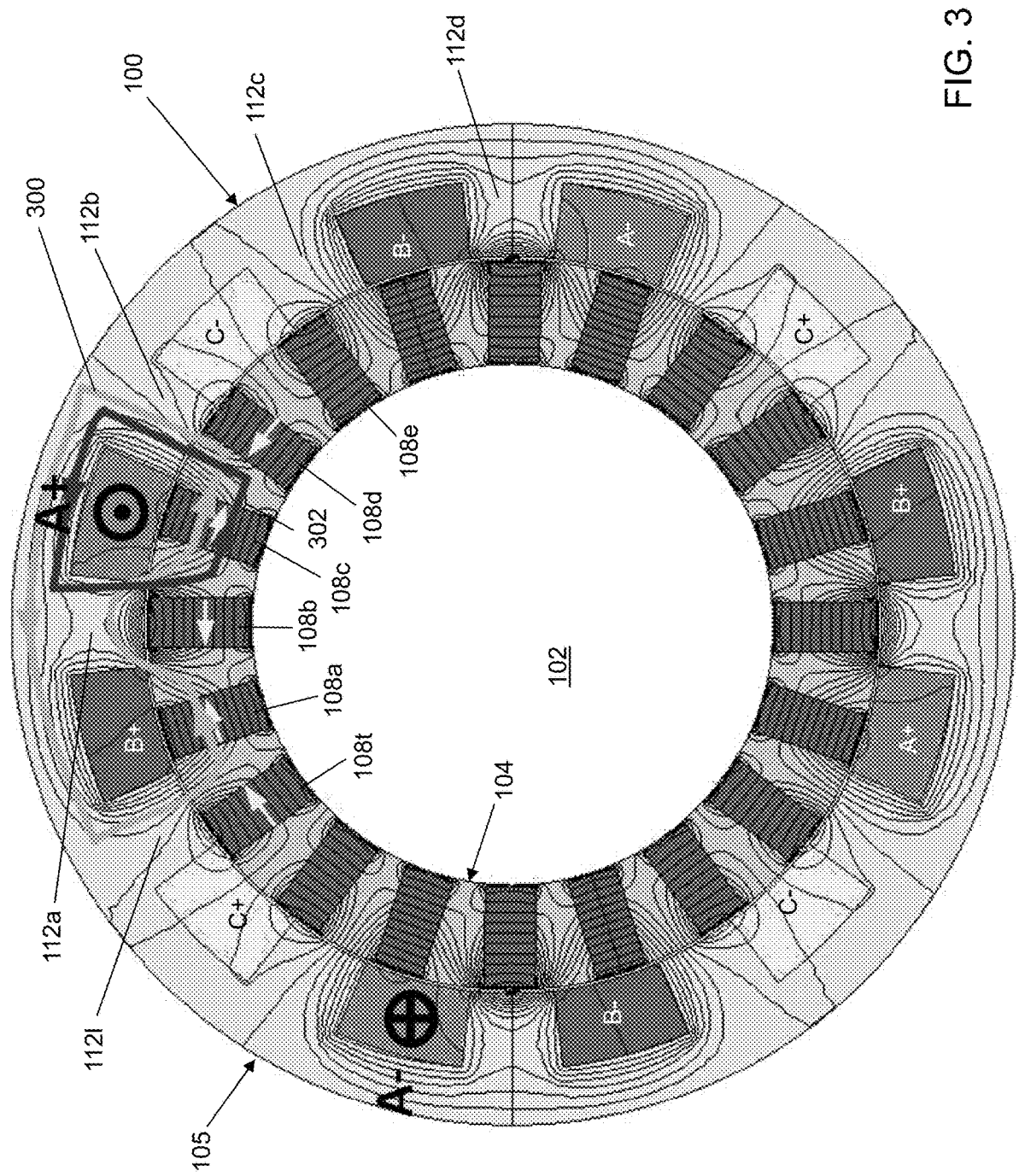
FIG. 3 shows flux lines that result from use of the radial, spoke type, VPPM of FIG. 1 in accordance with an illustrative embodiment.

Referring to FIG. 3, flux lines that result from use of radial, spoke type VPPM 100 under no load is shown in accordance with an illustrative embodiment. For reference, a twelfth tooth 1121 of the plurality of teeth 112 is labeled. A fifth PM 108e and a twentieth PM 118t are labeled with white arrows denoting the PM magnetizing directions. One set of coils of phase A are marked out with the 'dot' representing a positive direction of current associated with coil A, and a 'cross' representing a negative direction of current associated with coil A. The flux lines from the PMs that links to coil set A can be seen surrounding each associated slot where a one-fourth model of the flux line distribution is shown due to symmetry. A first magnet flux path 300 and a second magnet flux path 302 are two major rotor magnet flux paths that link to coil A with the arrows indicating the corresponding flux direction.

Figure 4:
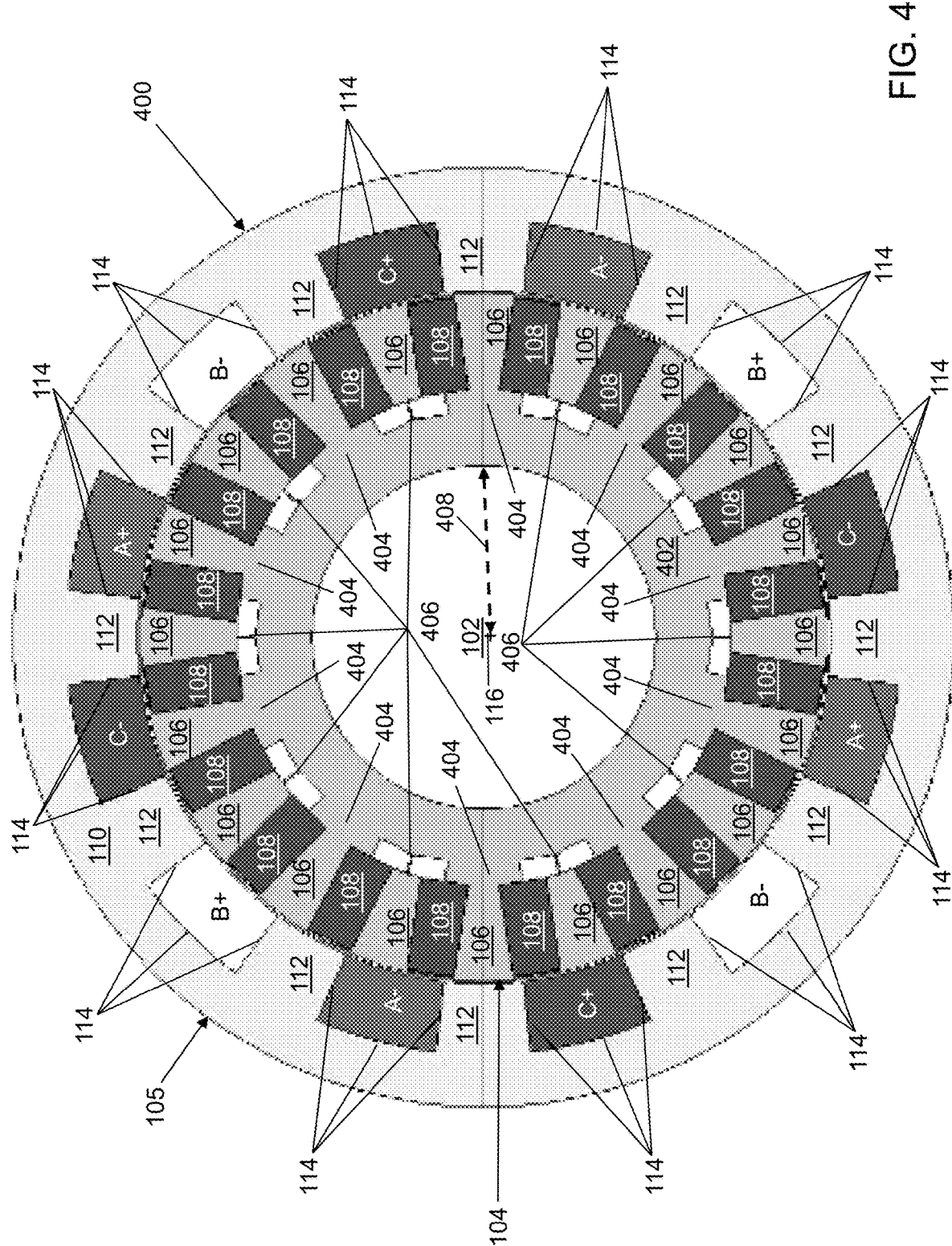
FIG. 4 depicts a radial, spoke type, VPPM with alternating air gaps between permanent magnets and with the stator and a rotor positioned radially adjacent to each other in accordance with an illustrative embodiment.

Referring to FIG. 4, a second radial, spoke type VPPM 400 is shown in accordance with an illustrative embodiment. Second radial, spoke type VPPM 400 may include shaft 102, rotor 104, stator 105, a rotor inner core 402, and a plurality of rotor inner core teeth 404 positioned radially adjacent to each other. The plurality of rotor inner core teeth 404 extend outward from rotor inner core 402 relative to center 116. In the illustrative embodiment of FIG. 4, rotor 104 is mounted to the plurality of rotor inner core teeth 404, and rotor inner core 402 is mounted to shaft 102 interior of rotor core 106. Shaft 102, rotor inner core 402, rotor 104, and stator 105 have generally circular cross sections as shown with reference to FIG. 4. A inner rotor radius 408 defines a radius of an inner surface of rotor inner core 402 relative to center 116.

Rotor inner core 402 is mounted to shaft 102 for rotation with shaft 102. A plurality of ribs 406 further extend radially from center 116 between rotor air gaps formed between the plurality of rotor inner core teeth 404. As understood by a person of skill in the art, rotor core 106, rotor inner core 402, the plurality of ribs 406, and the plurality of rotor inner core teeth 404 may be formed of laminations mounted closely together in the axial direction. Rotor inner core 402, the plurality of ribs 406, and the plurality of rotor inner core teeth 404 may be formed of a material similar to or the same as rotor core 106.

Figure 5:
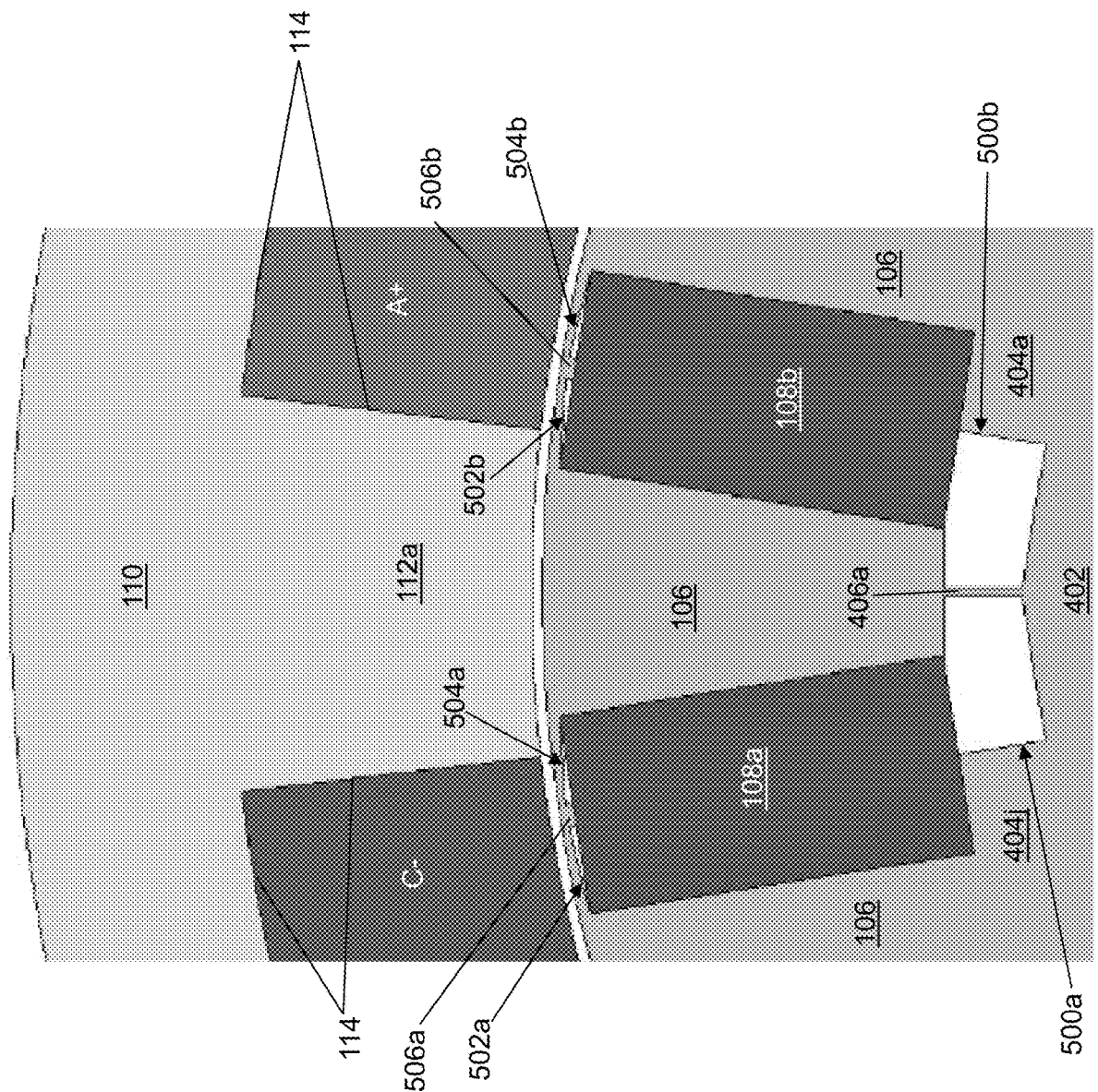
FIG. 5 depicts a zoomed portion of the radial, spoke type, VPPM of FIG. 4 in accordance with an illustrative embodiment.

Referring to FIG. 5, a zoomed portion of second radial, spoke type, VPPM 400 is shown in accordance with an illustrative embodiment. A first rotor air gap 500a is formed in rotor inner core 402 between a twelfth rotor inner core tooth 404j of the plurality of rotor inner core teeth 404 and a first rib 406a of the plurality of ribs 406 below first PM 108a. Each tooth of the plurality of rotor inner core teeth 404 may be identical. Each rib of the plurality of ribs 406 may be identical. A second rotor air gap 500b is formed in rotor inner core 402 between first rib 406a of the plurality of ribs 406 and a first rotor inner core tooth 404a of the plurality of rotor inner core teeth 404 below second PM 108b. First rib 406a may extend radially from center 116 centered between first rotor air gap 500a and second rotor air gap 500b.

A first upper, left PM air gap 502a and a first upper, right PM air gap 504a may be formed above first PM 108a with a first upper rib 506a positioned between first upper, left PM air gap 502a and first upper, right PM air gap 504a. A second upper, left PM air gap 502b and a second upper, right PM air gap 504b may be formed above second PM 108b with a second upper rib 506b positioned between second upper, left PM air gap 502b and second upper, right PM air gap 504b. Though not shown, similar upper air gaps 502, 504 may be formed in rotor 104 of radial, spoke type, VPPM 100. Identical upper air gaps may be formed around each PM of the plurality of PMs 108.

Figure 6:
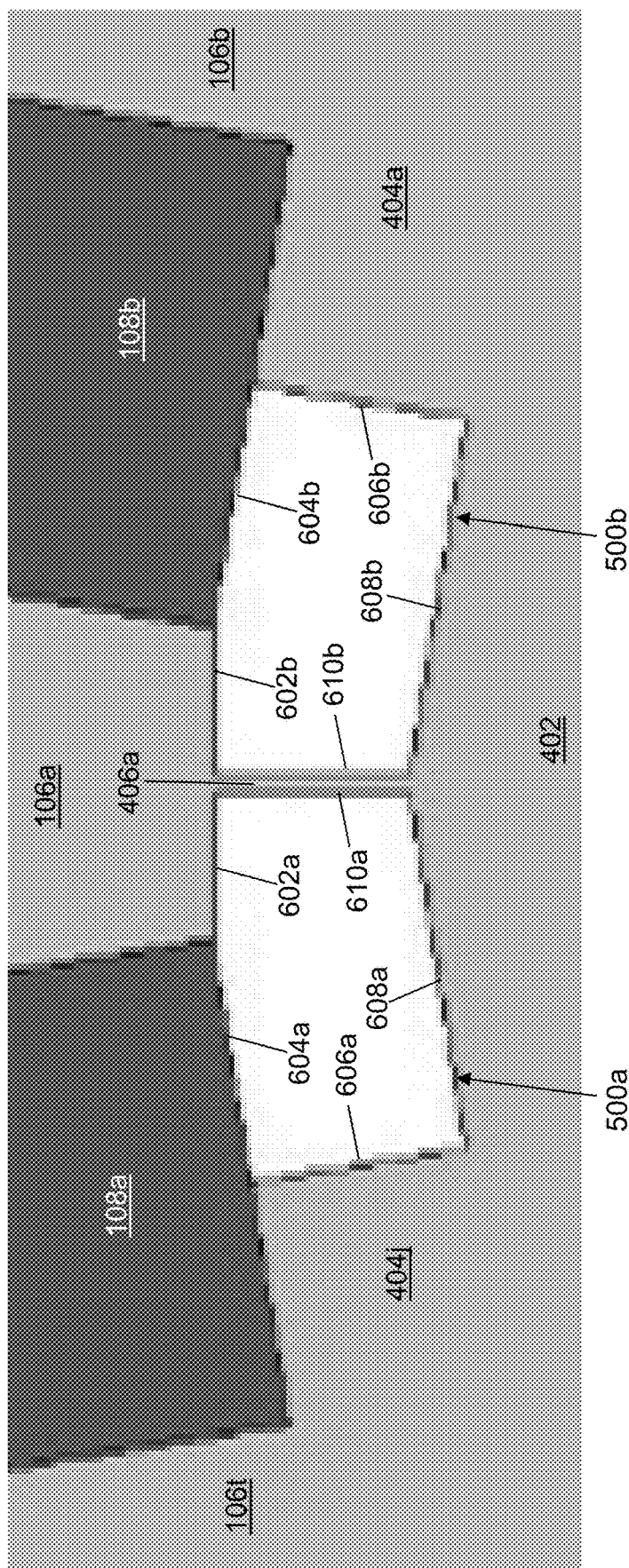
FIG. 6 depicts a zoomed portion of the alternating air gaps of the rotor of the radial, spoke type, VPPM of FIG. 4 in accordance with an illustrative embodiment.

Referring to FIG. 6, a zoomed portion of first rotor air gap 500a and second rotor air gap 500b of rotor inner core 402 of second radial, spoke type, VPPM 400 is shown in accordance with an illustrative embodiment. First rotor air gap 500a may be defined by a first wall 602a, a second wall 604a, a third wall 606a, a fourth wall 608a, and a fifth wall 610a. Second rotor air gap 500b may be similarly defined by a first wall 602b, a second wall 604b, a third wall 606b, a fourth wall 608b, and a fifth wall 610b such that second rotor air gap 500b is a mirror image of first rotor air gap 500a relative to first rib 406a. Pairs of rotor air gaps may be defined between successive pairs of PMs of the plurality of PMs 108. Fifth wall 610a extends along an edge of first rib 406a facing into first rotor air gap 500a. Second wall 604a extends along an edge of first PM 108a facing into first rotor air gap 500a. First wall 602a extends from an edge of first PM 108a to a top edge of first rib 406a between an edge of second wall 604a and an edge of fifth wall 610a. Fourth wall 608b extends from a bottom edge of first rib 406a between an edge of third wall 606a and a second edge of fifth wall 610a.

The rotor air gaps 500 act as flux barriers and may be filled with air or other material with a permeability approximately equal to air. Second wall 604a and second wall 604b of each rotor air gap may include an intermediate layer of material to separate first PM 108a from first rotor air gap 500a and to separate second PM 108b from second rotor air gap 500b, respectively. The intermediate layer may be formed of a material having a low permeability (e.g., approximately equal to air). Alternatively, second wall 604a and second wall 604b may be formed by first PM 108a and separate second PM 108b, respectively.

Referring to FIG. 7, first rotor air gap 500a and first PM 108a of second radial, spoke type, VPPM 400 are shown in accordance with an illustrative embodiment. A first angle 700 is defined between first wall 602a and fifth wall 610a. A second angle 702 is defined between second wall 604a and third wall 606a. A third angle 704 is defined between third wall 606a and fourth wall 608a. A fourth angle 706 is defined between fourth wall 608a and fifth wall 610a. A sixth angle (not labeled) between first wall 602a and second wall 604a is equal to 180 degrees minus first angle 700 in degrees. A sixth angle (not labeled) between first wall 602a and second wall 604a is equal to 180 degrees minus fourth angle 706. In the illustrative embodiment, first angle 700, second angle 702, and third angle 704 are equal to ninety degrees. As a result, in the illustrative embodiment, second wall 604a and fourth wall 608a are parallel to each other, and third wall 606a is perpendicular to second wall 604a and fourth wall 608a. Third wall 606a is parallel to a center line 720 that extends through a center of first PM 108a. In the illustrative embodiment, center line 720 is parallel to the side walls of each of the plurality of PMs 108. In alternative embodiments, the side walls of each of the plurality of PMs 108 may not be parallel to center line 720.

A first wall length 708 defines a length of first wall 602a. A second wall length 710 defines a length of second wall 604a. A third wall length 712 defines a length of third wall 606a. A fourth wall length 714 defines a length of fourth wall 602a. A fifth wall length 716 defines a length of fifth wall 610a. Fifth wall length 716 further defines a height of first rib 406a, and a rib width 718 defines a width of first rib 406a. Rib width 718 is defined between a first line 722 that is parallel to and includes fifth wall 610a and a second line 724 that is parallel to and includes fifth wall 610b. A radial line 726 centered between first line 722 and second line 724 extends through center 116. First line 722 and second line 724 are parallel to radial line 726.

Second wall length 710 may be selected as a percentage of width 226 of first PM 108a. For example, illustrative percentages for second wall length 710 may be 40% to 80% of width 226 of first PM 108a. Third wall length 712 also may be selected as a percentage of width 226 of first PM 108a. For example, illustrative percentages for third wall length 712 may be 20% to 40% of width 226 of first PM 108a. Rib width 718 may be selected as a percentage of an inner rotor radius 408. For example, illustrative percentages for rib width 718 may be 0.3% to 2.5% of inner rotor radius 408. For example, first angle 700 can be selected between 30 and 150 degrees.

Though each air rotor air gap of the rotor air gaps 500 is shown with five walls, each air rotor air gap of the rotor air gaps 500 may include a fewer or a greater number of walls dependent on a selection of the angle of first angle 700. Though each corner defined by first angle 700, second angle 702, third angle 704, and fourth angle 706 is squared in the illustrative embodiment, the corners may be rounded.

Figure 8A:
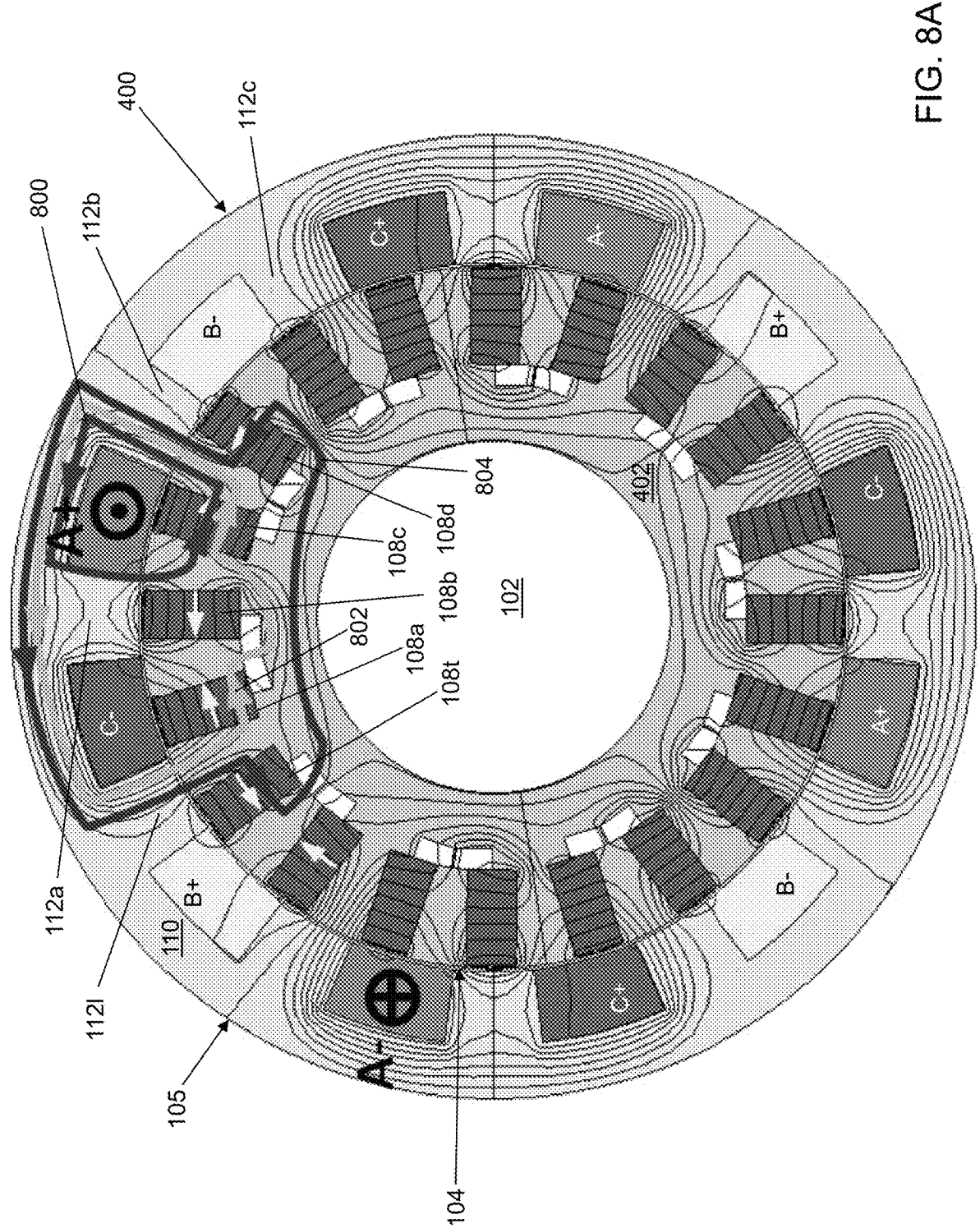
FIG. 8A shows flux lines at no load that result from use of the radial, spoke type, VPPM of FIG. 4 in accordance with an illustrative embodiment.

Referring to FIG. 8A, flux lines that result from use of second radial, spoke type VPPM 400 under no load is shown in accordance with an illustrative embodiment. There are three major rotor magnet flux paths, linking four magnets to coil A. A first flux path 800 surrounds a first slot bordered by first tooth 112a and second tooth 112b and extends through third PM 108c. A second flux path 802 surrounds the first slot bordered by first tooth 112a and second tooth 112b and a twelfth slot bordered by twelfth tooth 1121 and first tooth 112a and extends through first PM 108a and third PM 108c. Second flux path 802 also extends across first rib 406a between first rotor air gap 500a of first PM 108a and second rotor air gap 500b of second PM 108b. A third flux path 804 surrounds the first slot bordered by first tooth 112a and second tooth 112b and the twelfth slot bordered by twelfth tooth 1121 and first tooth 112a and extends through twentieth PM 108t and fourth PM 108d to link two more PMS to coil A relative to a number of PMs linking to the same coil of radial, spoke type VPPM 100 shown in FIG. 3. In other words, the alternating use of first rotor air gap 500a and second rotor air gap 500b as rotor flux barriers supports the use of an enlarged rotor back iron without providing a magnetic short circuit to the plurality of PMs 108. Flux leakage in the air gap and the leakage iron path is also greatly reduced compared to that of radial, spoke type VPPM 100.

Figure 8B:
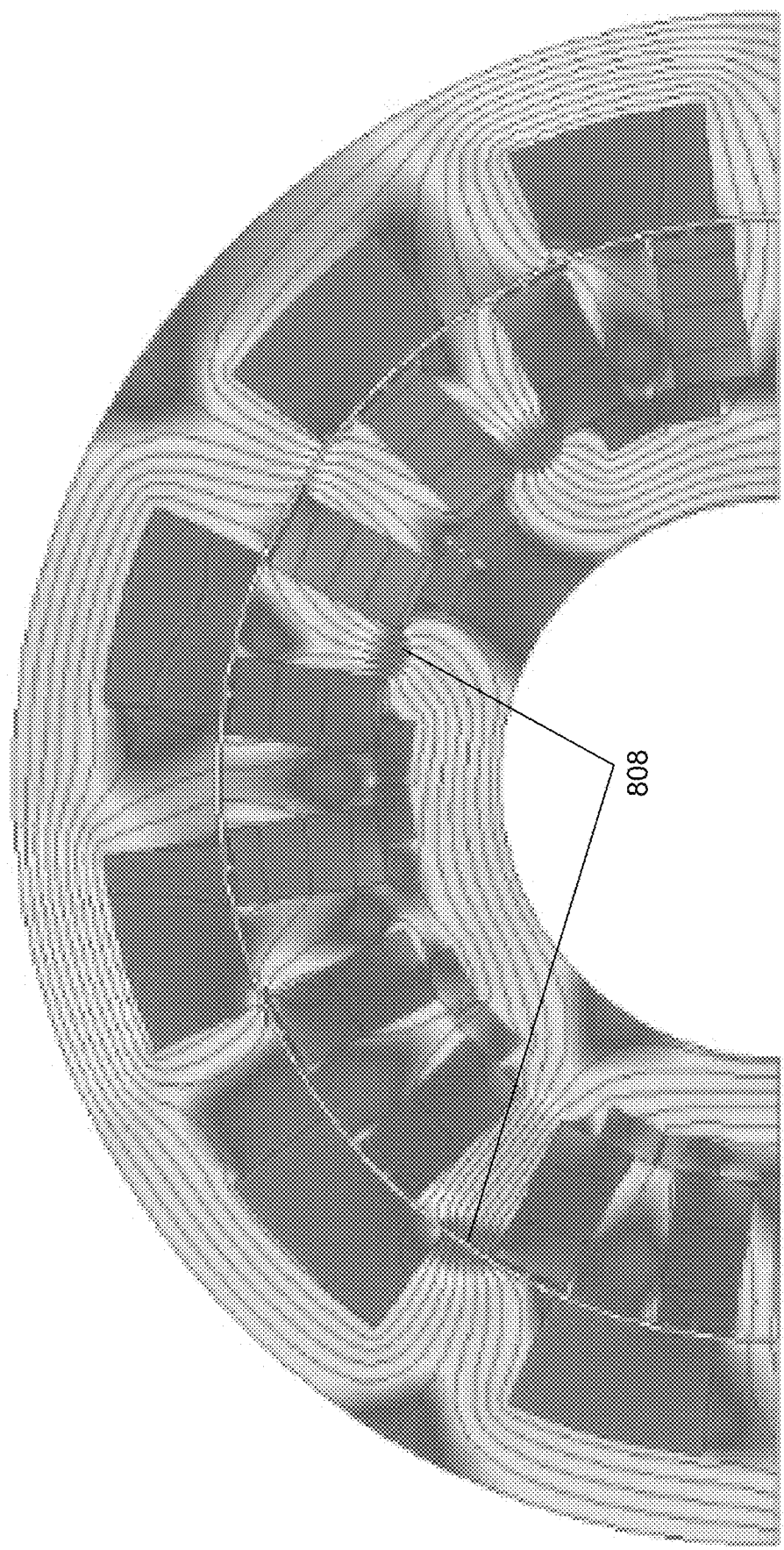
FIG. 8B shows a flux distribution at rated load that result from use of the radial, spoke type, VPPM of FIG. 4 in accordance with an illustrative embodiment.

Furthermore, second radial, spoke type VPPM 400 provides a flux path not only for the magnet flux, but also for the stator MMF at rated load as shown referring to FIG. 8B fourth flux path 808. The stator MMF does not need to traverse across the spoke type magnets, which are effectively large air gaps. Thus, the flux density that limits the torque production capability is significantly increased. $P_r=2S_s-P_s$ was chosen in the illustrative embodiment due to the challenge of fitting thick ferrite magnets into a limited rotor space. This would not be a problem for second radial, spoke type VPPM 400 having a larger diameter and the results could be further improved.

A comparison between the radial, spoke type, VPPMs of FIGS. 1 and 4 in accordance with illustrative embodiments and an existing interior PM machine (IPPM) was performed. A performance comparison is tabulated in Table 1 below. To make a fair comparison between the IPPM, radial, spoke type VPPM 100, and second radial, spoke type VPPM 400, a machine outer stator diameter of 355.6 millimeters (mm), a stack length of 311.15 mm, and a current density of 4.6 ARMS/mm² for the stator excitation were all kept the same. Ferrite PMs were used for radial, spoke type VPPM 100 and for second radial, spoke type VPPM 400; whereas, a neodymium, iron and boron alloy rare earth PM was used for the IPPM.

TABLE 1

|  | Torque | Power Factor [lagging] |
| --- | --- | --- |
| IPPM | 534 | 0.85 |
| VPPM 100 | 329 | 0.61 |
| VPPM 400 | 606 | 0.82 |

Figure 9:
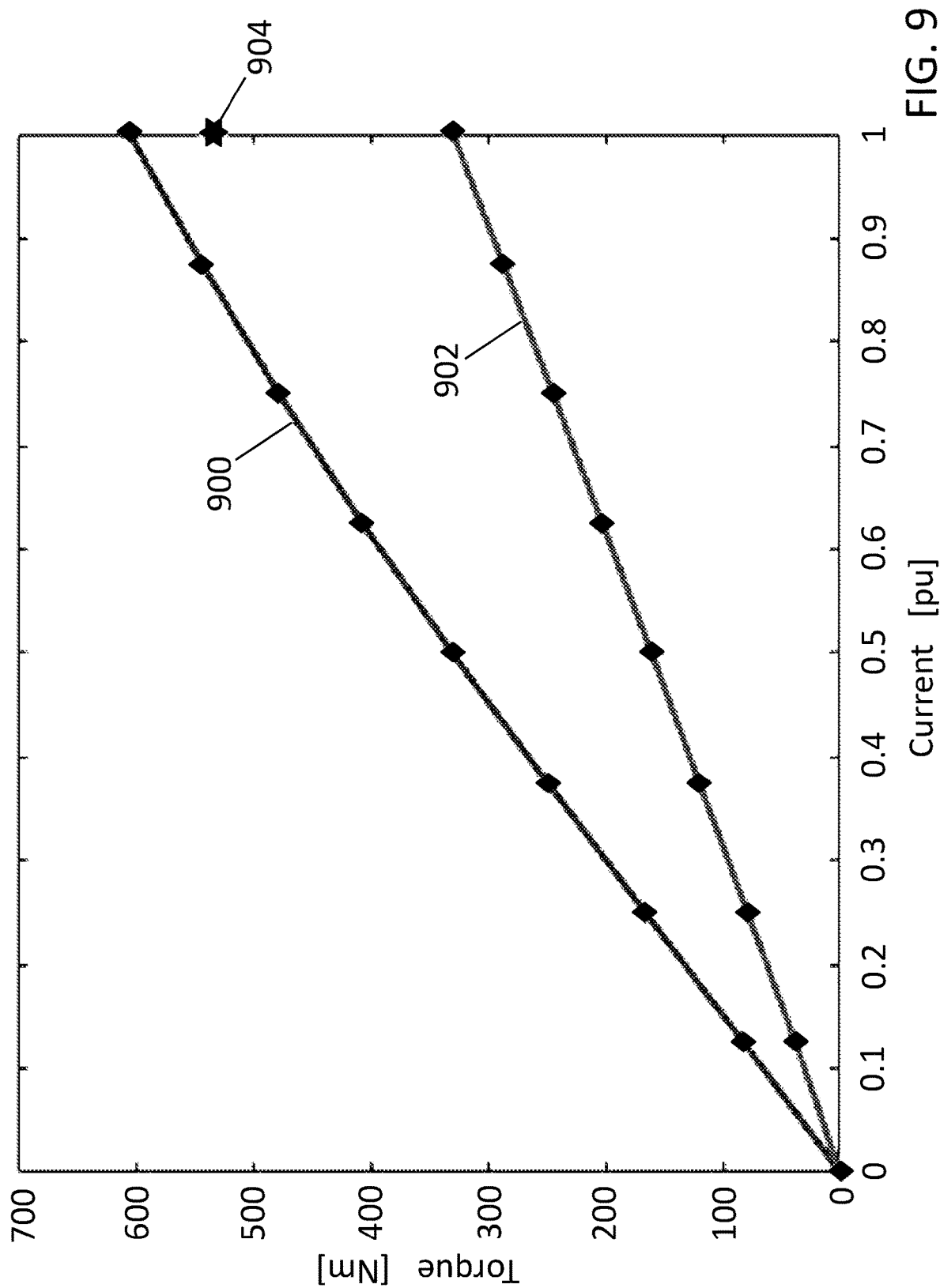
FIG. 9 shows a comparison of a torque generated as a function of current between the radial, spoke type, VPPMs of FIGS. 1 and 4 in accordance with illustrative embodiments.

FIG. 9 shows a comparison of a torque generated as a function of excitation current between the radial, spoke type, VPPMs of FIGS. 1 and 4 and the IPPM in accordance with illustrative embodiments. A first curve 900 shows the torque generated as a function of excitation current for second radial, spoke type VPPM 400. A second curve 902 shows the torque generated as a function of excitation current for radial, spoke type VPPM 100. An operating point 904 shows the torque generated for the IPPM. The results of FIG. 9 indicate that second radial, spoke type VPPM 400 greatly improves the torque production relative to radial, spoke type VPPM 100. The improvement was by 84%. The torque capability of second radial, spoke type VPPM 400 even surpasses that of the IPPM with a satisfactory power factor 0.82 achieved at the same time as shown in Table 1.

Ferrite magnets were used as a replacement for rare earth magnets to reduce an active material cost of second radial, spoke type VPPM 400. Overall, the single air gap topology of second radial, spoke type VPPM 400 reduces a manufacturing complexity, mechanical structural challenges, and thermal issues, which are predominant problems for existing high torque density spoke type Vernier machine solutions that have a dual stator topology. Second radial, spoke type VPPM 400 shows considerable utility in low and medium speed applications both as a motor and a generator.

Figure 10:
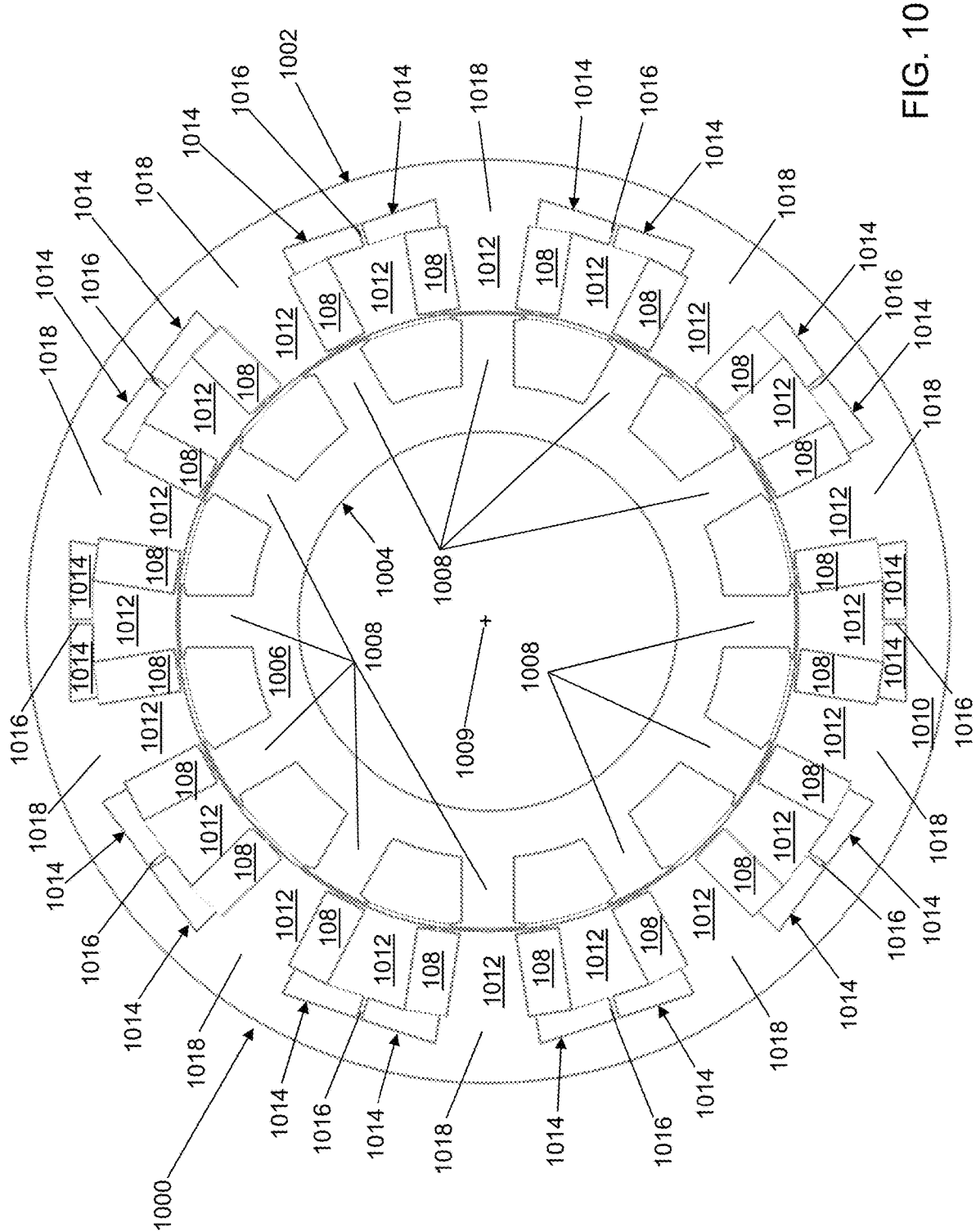
FIG. 10 depicts a radial, spoke type, VPPM with alternating air gaps between permanent magnets and with the stator and the rotor positioned radially adjacent to each other in accordance with a second illustrative embodiment.

Referring to FIG. 10, a third radial, spoke type VPPM 1000 is shown in accordance with an illustrative embodiment. Third radial, spoke type VPPM 1000 may include a rotor 1002 and a stator 1004 positioned radially adjacent to each other with stator 1004 interior of rotor 1002. Though not shown, rotor 1002 is mounted to a shaft for rotation around stator 1004. Third radial, spoke type VPPM 1000 is otherwise similar to second radial, spoke type VPPM 400. Rotor 1002 and stator 1004 have generally circular cross sections as shown with reference to FIG. 10.

Stator 1004 may be formed of a ferromagnetic material such as iron, cobalt, nickel, etc. Stator 1004 may include a stator core 1006 and a plurality of teeth 1008. The plurality of teeth 1008 extend outward from stator core 1006 away from a center 1009 of an interior of third radial, spoke type VPPM 1000. Similar to stator 105, a plurality of slot walls define edges of stator slots where a slot is positioned between a pair of the plurality of teeth 1008. In the illustrative embodiment, the plurality of teeth 1008 of stator 1004 includes 12 teeth that define 12 stator slots $S_s=12$. In the illustrative embodiment of FIG. 10, the plurality of teeth 1008 are T-shaped though other shapes are possible. As understood by a person of skill in the art, stator 1004 may be formed of laminations mounted closely together in the axial direction.

Rotor 1002 may formed of a ferromagnetic material such as iron, cobalt, nickel, etc. Rotor 1002 may include a rotor outer core 1010, a rotor core 1012, the plurality of permanent magnets 108, a plurality of rotor outer core teeth 1018, and a plurality of ribs 1016. The plurality of permanent magnets 108 is mounted radially as spokes within rotor core 1012. As understood by a person of skill in the art, rotor outer core 1010, rotor core 1012, the plurality of rotor inner core teeth 1018, and the plurality of ribs 1016 may be formed of the same or similar materials and as laminations mounted closely together in the axial direction.

In the illustrative embodiment of FIG. 10, the plurality of rotor outer core teeth 1018 and the plurality of ribs 1016 are mounted to rotor outer core 1010 to extend inward from rotor outer core 1010 toward center 1009. Rotor core 1012 is mounted to extend inward from the plurality of rotor outer core teeth 1018 and the plurality of ribs 1016. The plurality of ribs 1016 extend between a plurality of rotor air gaps 1014 formed between the plurality of rotor outer core teeth 1018 and the plurality of ribs 1016 in a manner similar to the rotor air gaps of second radial, spoke type, VPPM 400.

Figure 11:
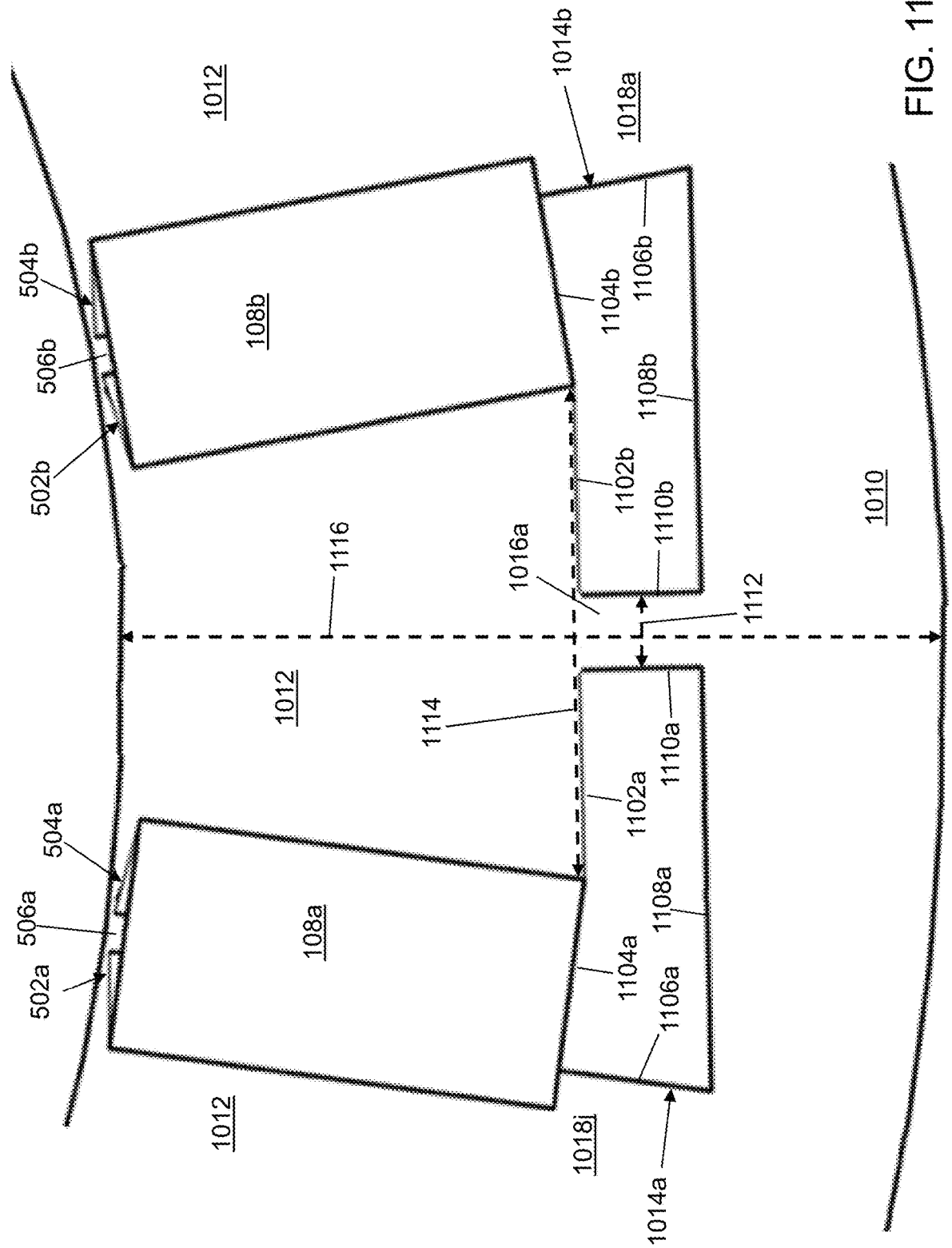
FIG. 11 depicts a zoomed portion of the alternating air gaps of the rotor of the radial, spoke type, VPPM of FIG. 10 in accordance with an illustrative embodiment.

Referring to FIG. 11, a zoomed portion of third radial, spoke type, VPPM 1000 is shown in accordance with an illustrative embodiment. A first rotor air gap 1014a is formed in rotor outer core 1010 between a twelfth rotor outer core tooth 1018j of the plurality of rotor outer core teeth 1018 and a first rib 1016a of the plurality of ribs 1016 below first PM 108a. Each tooth of the plurality of rotor outer core teeth 1018 may be identical. Each rib of the plurality of ribs 1016 may be identical. A second rotor air gap 1014b is formed in rotor outer core 1010 between first rib 1016a of the plurality of ribs 1016 and a first rotor outer core tooth 1018a of the plurality of rotor outer core teeth 1018 below second PM 108b. First rib 1016a may extend radially from center 1009 centered between first rotor air gap 1014a and second rotor air gap 1014b.

First upper, left PM air gap 502a and first upper, right PM air gap 504a may be formed above first PM 108a with first upper rib 506a positioned between first upper, left PM air gap 502a and first upper, right PM air gap 504a. Second upper, left PM air gap 502b and second upper, right PM air gap 504b may be formed above second PM 108b with second upper rib 506b positioned between second upper, left PM air gap 502b and second upper, right PM air gap 504b. Identical upper air gaps may be formed around each PM of the plurality of PMs 108.

Similar to first rotor air gap 500a, first rotor air gap 1014a may be defined by a first wall 1102a, a second wall 1104a, a third wall 1106a, a fourth wall 1108a, and a fifth wall 1110a. Similar to second rotor air gap 500b, second rotor air gap 1014b may be similarly defined by a first wall 1102b, a second wall 1104b, a third wall 1106b, a fourth wall 1108b, and a fifth wall 1110b such that second rotor air gap 1014b is a mirror image of first rotor air gap 1014a relative to first rib 1016a. Pairs of rotor air gaps may be defined between successive pairs of PMs of the plurality of PMs 108. Fifth wall 1110a extends along an edge of first rib 1016a facing into first rotor air gap 1014a. Second wall 1104a extends along an edge of first PM 108a facing into first rotor air gap 1014a. First wall 1102a extends from an edge of first PM 108a to a top edge of first rib 1016a between an edge of second wall 1104a and an edge of fifth wall 1110a. Fourth wall 1108b extends from a bottom edge of first rib 1016a between an edge of third wall 1106a and a second edge of fifth wall 1110a. A rib width 1112 defines a width of first rib 1016a. a PM distance 1114 defines a distance between a corner of first PM 108a at an end of first wall 1102a and a corner of second PM 108b at an end of first wall 1102b.

Figure 12:
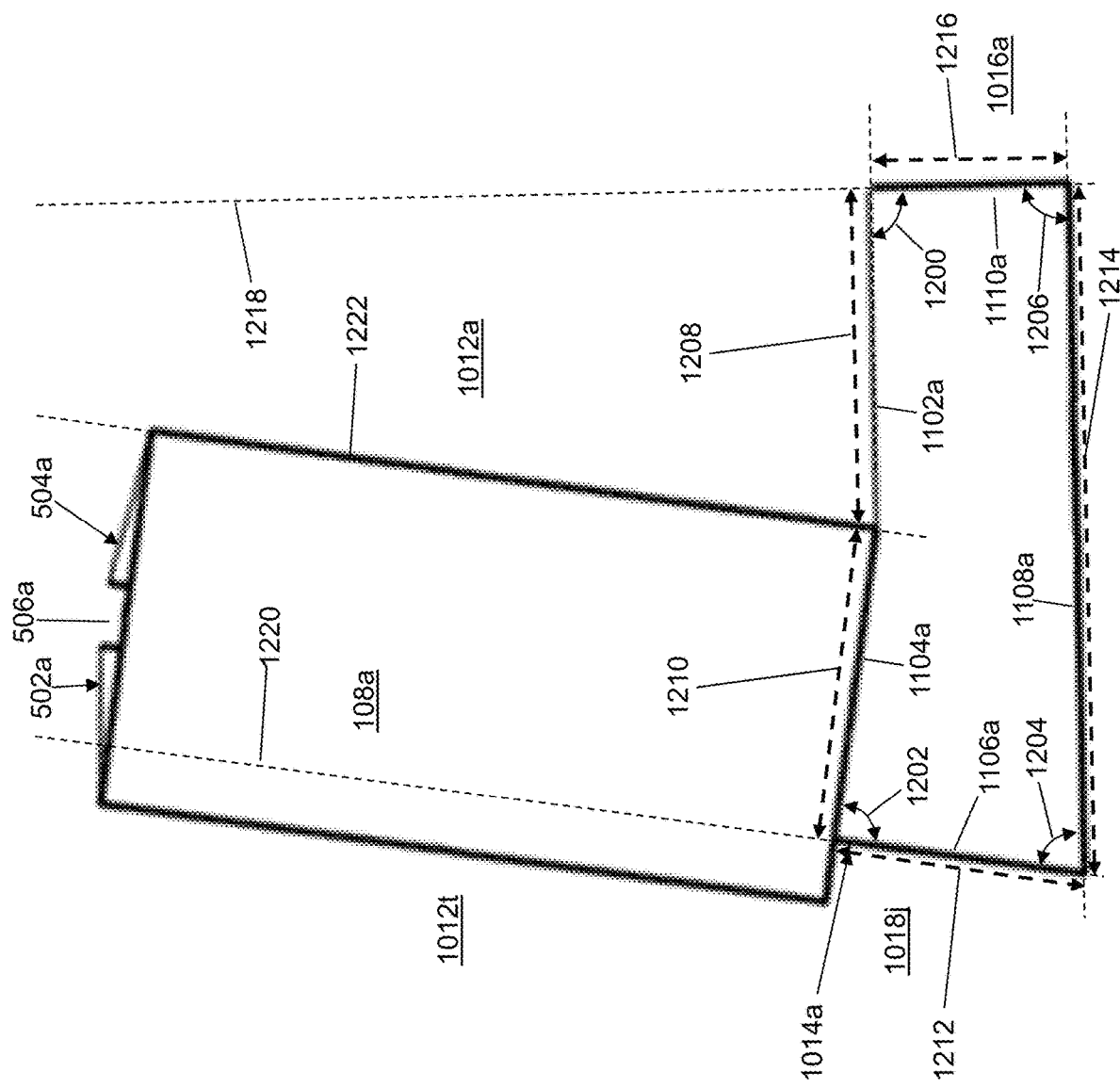
FIG. 12 depicts an air gap and permanent magnet of the rotor of the radial, spoke type, VPPM of FIG. 10 in accordance with an illustrative embodiment.

Referring to FIG. 12, first rotor air gap 1014a and first PM 108a of third radial, spoke type, VPPM 1000 are shown in accordance with an illustrative embodiment. A first angle 1200 is defined between first wall 1102a and fifth wall 1110a. A second angle 1202 is defined between second wall 1104a and third wall 1106a. A third angle 1204 is defined between third wall 1106a and fourth wall 1108a. A fourth angle 1206 is defined between fourth wall 1108a and fifth wall 1110a. A sixth angle (not labeled) between first wall 1102a and second wall 1104a is equal to 90 degrees plus second angle 700 in degrees. In the illustrative embodiment, first angle 1200 and fourth angle 1206 are equal to ninety degrees. As a result, in the illustrative embodiment, first wall 1102a and fourth wall 1108a are parallel to each other, and fifth wall 1110a is perpendicular to first wall 1102a and fourth wall 1108a. Fifth wall 1110a is parallel to a radial line 1218 that extends towards center 1009. Third wall 1106a is parallel to a line 1220 that is also parallel to a surface 1222 of first PM 108a that forms the intersection of first wall 1102a and second wall 1104a.

A first wall length 1208 defines a length of first wall 1102a. A second wall length 1210 defines a length of second wall 1104a. A third wall length 1212 defines a length of third wall 1106a. A fourth wall length 1214 defines a length of fourth wall 1102a. A fifth wall length 1216 defines a length of fifth wall 1110a. Fifth wall length 1216 further defines a height of first rib 1016a.

Second wall length 1210 may be selected as a percentage of width 226 of first PM 108a. For example, illustrative percentages for second wall length 1210 may be 40% to 80% of width 226 of first PM 108a. Third wall length 1212 also may be selected as a percentage of width 226 of first PM 108a. For example, illustrative percentages for third wall length 1212 may be 40% to 80% of width 226 of first PM 108a. Rib width 1112 may be selected as a percentage of total rotor width 1116. For example, illustrative percentages for rib width 1112 may be 0.3% to 2.5% of total rotor width 1116.

Figure 13:
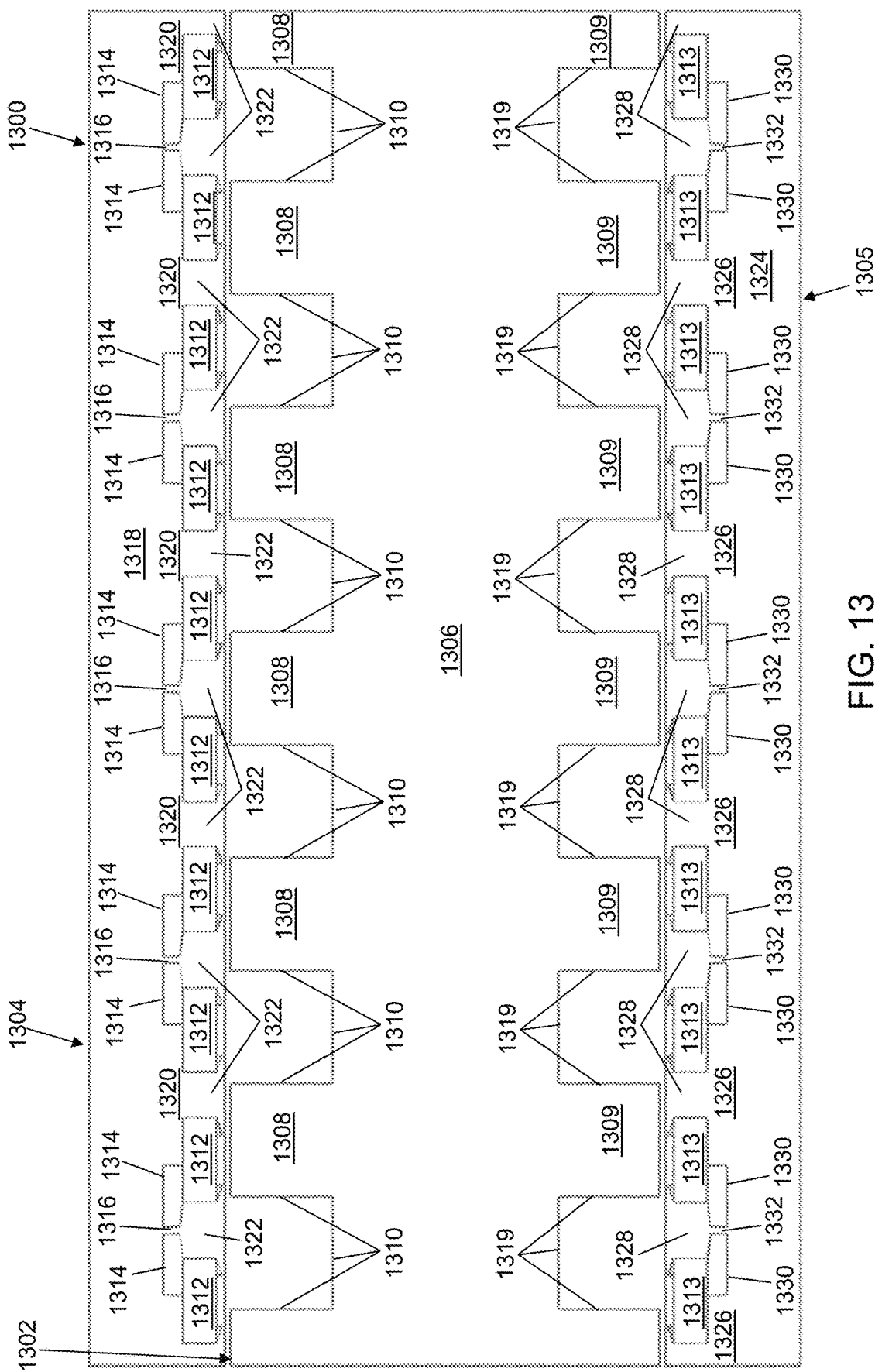
FIG. 13 depicts a double air gap, axial VPPM with a first rotor and a second rotor positioned axially on either side of a stator in accordance with an illustrative embodiment.

Referring to FIG. 13, a double air gap, axial VPPM 1300 is shown in accordance with an illustrative embodiment. Axial VPPM 1300 may include a stator 1302, a first rotor 1304, and a second rotor 1306 positioned axially adjacent each other with stator 1302 mounted between first rotor 1304 and second rotor 1306. Though not shown, first rotor 1304 and second rotor 1306 are mounted to a shaft for rotation relative to stator 1302. Though not visible because axial VPPM 1300 is shown straightened out for simplicity, stator 1302, first rotor 1304, and second rotor 1306 have generally circular cross sections.

Stator 1302 may be formed of a ferromagnetic material such as iron, cobalt, nickel, etc. As understood by a person of skill in the art, stator 1302 may be formed of laminations mounted closely together in the radial direction.

Stator 1302 may include a stator core 1306, a first plurality of teeth 1308, and a second plurality of teeth 1309. The first plurality of teeth 1308 and the second plurality of teeth 1309 may be mirror images of each other relative to a center of stator core 1306 that extends lengthwise between the first plurality of teeth 1308 and the second plurality of teeth 1309. The first plurality of teeth 1308 extend outward from stator core 1306 toward first rotor 1304 forming a first air gap between an outer surface of the first plurality of teeth 1308 and first rotor 1304. Similar to stator 105, a plurality of first slot walls 1310 define edges of stator slots where a slot is positioned between a pair of the first plurality of teeth 1308.

The second plurality of teeth 1309 extend outward from stator core 1306 toward second rotor 1306 forming a second air gap between an outer surface of the second plurality of teeth 1309 and second rotor 1306. Similar to stator 105, a plurality of second slot walls 1319 define edges of stator slots where a slot is positioned between a pair of the second plurality of teeth 1309. In the illustration of FIG. 13, the first plurality of teeth 1308 of stator 1302 includes six teeth that define six stator slots though an actual number of stator slots is again $S_{s1}=12$ for the first plurality of teeth 1308 and the second plurality of teeth 1309.

First rotor 1304 and second rotor 1306 may be mirror images of each other relative to the center of stator core 1306 that extends lengthwise between the first plurality of teeth 1308 and the second plurality of teeth 1309. First rotor 1304 and second rotor 1306 may be formed of a ferromagnetic material such as iron, cobalt, nickel, etc. First rotor 1304 may include a first rotor outer core 1318, a first rotor core 1322, a first plurality of permanent magnets 1312, a first plurality of rotor outer core teeth 1320, and a first plurality of ribs 1316. The first plurality of permanent magnets 1312 may be similar to the plurality of permanent magnets 108 and mounted radially as spokes within first rotor core 1322. As understood by a person of skill in the art, first rotor outer core 1318, first rotor core 1322, the first plurality of rotor outer core teeth 1320, and the first plurality of ribs 1316 may be formed of the same or similar materials and as laminations mounted closely together in the radial directions.

In the illustrative embodiment of FIG. 13, the first plurality of rotor outer core teeth 1320 and the first plurality of ribs 1316 are mounted to first rotor outer core 1318 to extend inward from first rotor outer core 1318 toward stator 1302. First rotor core 1322 is mounted to extend inward from the first plurality of rotor outer core teeth 1320 and the first plurality of ribs 1316. The first plurality of ribs 1316 extend between a first plurality of rotor air gaps 1314 formed between the first plurality of rotor outer core teeth 1320 and the first plurality of ribs 1316 in a manner similar to the rotor air gaps of second radial, spoke type, VPPM 400 relative to the plurality of PMs 108.

Second rotor 1305 may include a second rotor outer core 1324, a second rotor core 1328, a second plurality of permanent magnets 1313, a second plurality of rotor outer core teeth 1326, and a second plurality of ribs 1332. The second plurality of permanent magnets 1313 may be similar to the first plurality of permanent magnets 1312 and mounted radially as spokes within second rotor core 1328. As understood by a person of skill in the art, second rotor outer core 1324, second rotor core 1328, the second plurality of rotor outer core teeth 1326, and the second plurality of ribs 1332 may be formed of the same or similar materials and as laminations mounted closely together in the axial or radial directions.

In the illustrative embodiment of FIG. 13, the second plurality of rotor outer core teeth 1326 and the second plurality of ribs 1332 are mounted to second rotor outer core 1324 to extend inward from second rotor outer core 1324 toward stator 1302. Second rotor core 1328 is mounted to extend inward from the second plurality of rotor outer core teeth 1326 and the second plurality of ribs 1332. The second plurality of ribs 1332 extend between a second plurality of rotor air gaps 1330 formed between the second plurality of rotor outer core teeth 1326 and the second plurality of ribs 1332 in a manner similar to the rotor air gaps of second radial, spoke type, VPPM 400 relative to the plurality of PMs 108.

Figure 14:
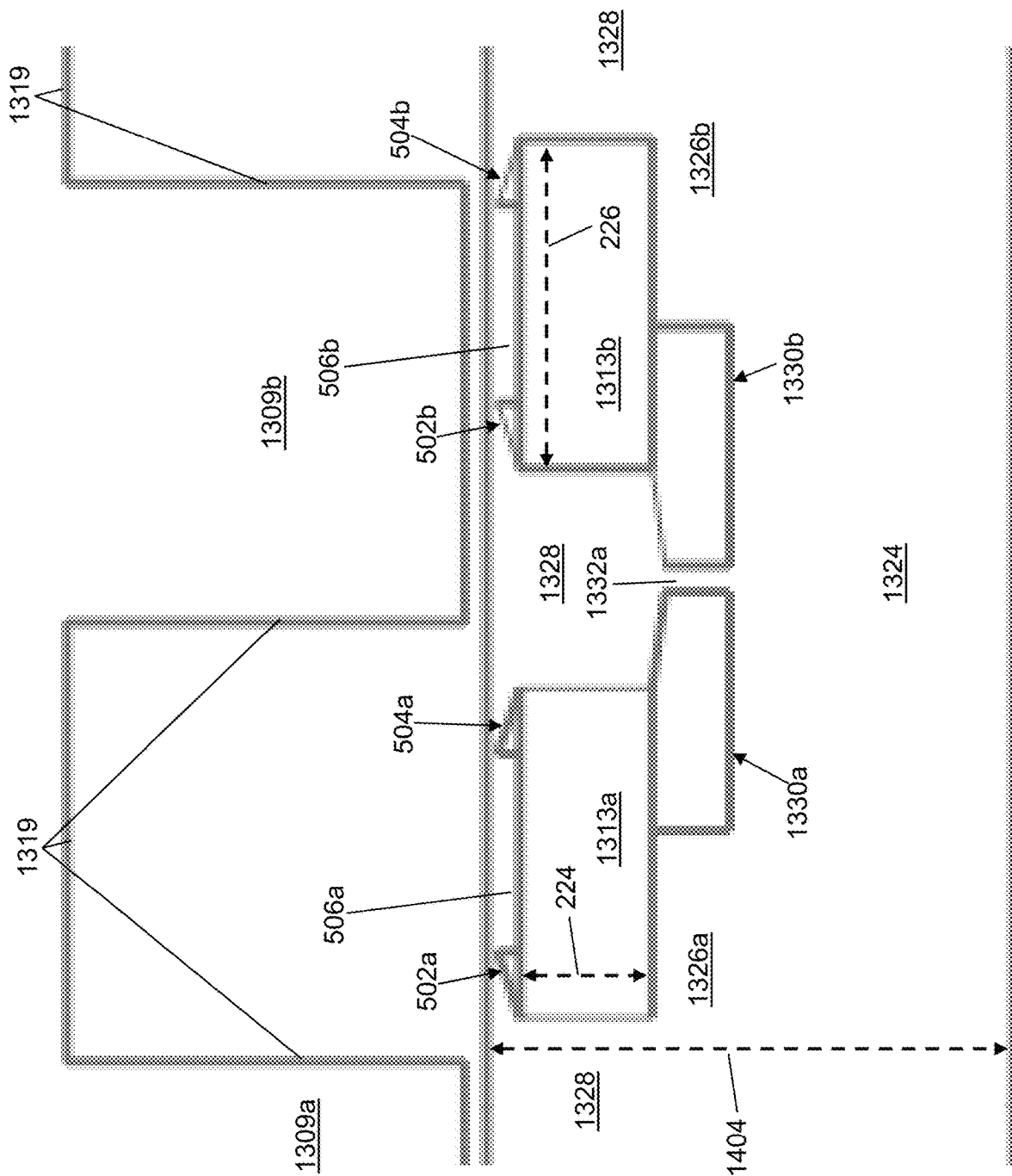
FIG. 14 depicts a zoomed portion the double air gap, axial VPPM of FIG. 13 in accordance with an illustrative embodiment.

Referring to FIG. 14, a zoomed portion of axial VPPM 1300 is shown in accordance with an illustrative embodiment. A first rotor air gap 1330a is formed in second rotor outer core 1324 between a first rotor outer core tooth 1326a of the second plurality of rotor outer core teeth 1326 and a first rib 1332a of the second plurality of ribs 1332 adjacent first PM 1313a of the second plurality of permanent magnets 1313. Each tooth of the first plurality of rotor outer core teeth 1320 and the second plurality of rotor outer core teeth 1326 may be identical. Each rib of first plurality of ribs 1316 and the second plurality of ribs 1332 may be identical. A second rotor air gap 1330b is formed in second rotor outer core 1324 between first rib 1332a of the second plurality of ribs 1332 and a second rotor outer core tooth 1326b of the plurality of second plurality of rotor outer core teeth 1326 adjacent second PM 1313b. First rib 1332a may extend toward the center of stator core 1306 that extends lengthwise between the first plurality of teeth 1308 and the second plurality of teeth 1309. First rib 1332a is centered between first rotor air gap 1330a and second rotor air gap 1330b. Each pair of rotor air gaps of the first plurality of rotor air gaps 1314 and of the second plurality of rotor air gaps 1330 may be identical.

First upper, left PM air gap 502a and first upper, right PM air gap 504a may be formed between first PM 108a and the second plurality of teeth 1309 with first upper rib 506a positioned between first upper, left PM air gap 502a and first upper, right PM air gap 504a. Second upper, left PM air gap 502b and second upper, right PM air gap 504b may be formed between second PM 108b and the second plurality of teeth 1309 with second upper rib 506b positioned between second upper, left PM air gap 502b and second upper, right PM air gap 504b. Identical upper air gaps may be formed around each PM of the first plurality of permanent magnets 1312 and of the second plurality of permanent magnets 1313. Rotor width 1400 defines a width of first rotor 1304 and of second rotor 1305.

Figure 15:
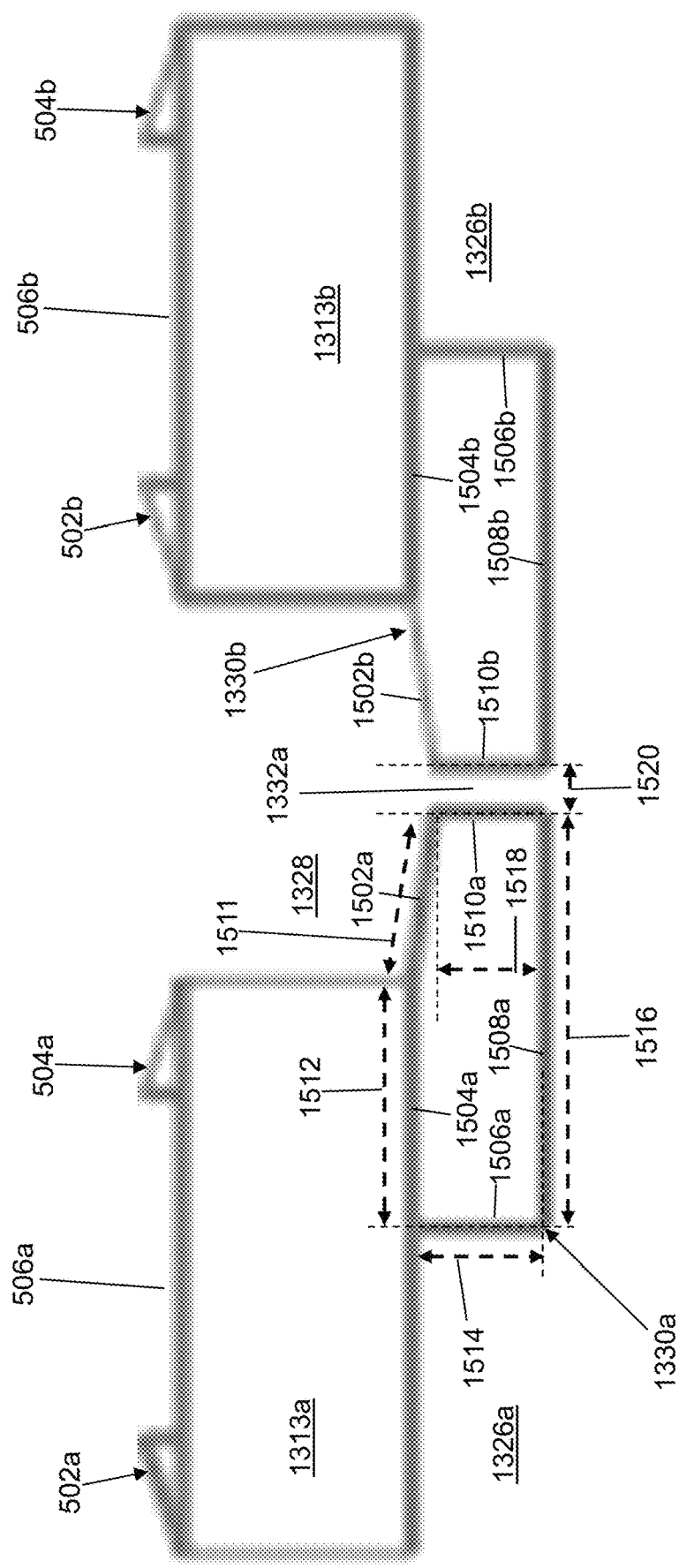
FIG. 15 depicts a zoomed portion of the alternating air gaps of the rotor of the double air gap, axial VPPM of FIG. 13 in accordance with an illustrative embodiment.

Referring to FIG. 15, a zoomed portion of a pair of rotor air gaps of axial VPPM 1300 are shown in accordance with an illustrative embodiment. Similar to first rotor air gap 500a, a first rotor air gap 1330a may be defined by a first wall 1502a, a second wall 1504a, a third wall 1506a, a fourth wall 1508a, and a fifth wall 1510a. Similar to second rotor air gap 500b, a second rotor air gap 1330b may be similarly defined by a first wall 1502b, a second wall 1504b, a third wall 1506b, a fourth wall 1508b, and a fifth wall 1510b such that second rotor air gap 1330b is a mirror image of first rotor air gap 1330a relative to first rib 1332a. Identical pairs of rotor air gaps may be defined between successive pairs of PMs of the first plurality of permanent magnets 1312 and of the second plurality of permanent magnets 1313. Fifth wall 1510a extends along an edge of first rib 1332a facing into first rotor air gap 1330a. Second wall 1504a extends along an edge of first PM 1313a facing into first rotor air gap 1330a. First wall 1502a extends from an edge of first PM 1313a to a top edge of first rib 1332a between an edge of second wall 1504a and an edge of fifth wall 1510a. Fourth wall 1508b extends from a bottom edge of first rib 1332a between an edge of third wall 1506a and a second edge of fifth wall 1510a. A rib width 1520 defines a width of first rib 1332a.

A first wall length 1511 defines a length of first wall 1502a. A second wall length 1512 defines a length of second wall 1504a. A third wall length 1514 defines a length of third wall 1506a. A fourth wall length 1516 defines a length of fourth wall 1502a. A fifth wall length 1518 defines a length of fifth wall 1510a. Fifth wall length 1518 further defines a height of first rib 1332a.

Figure 16:
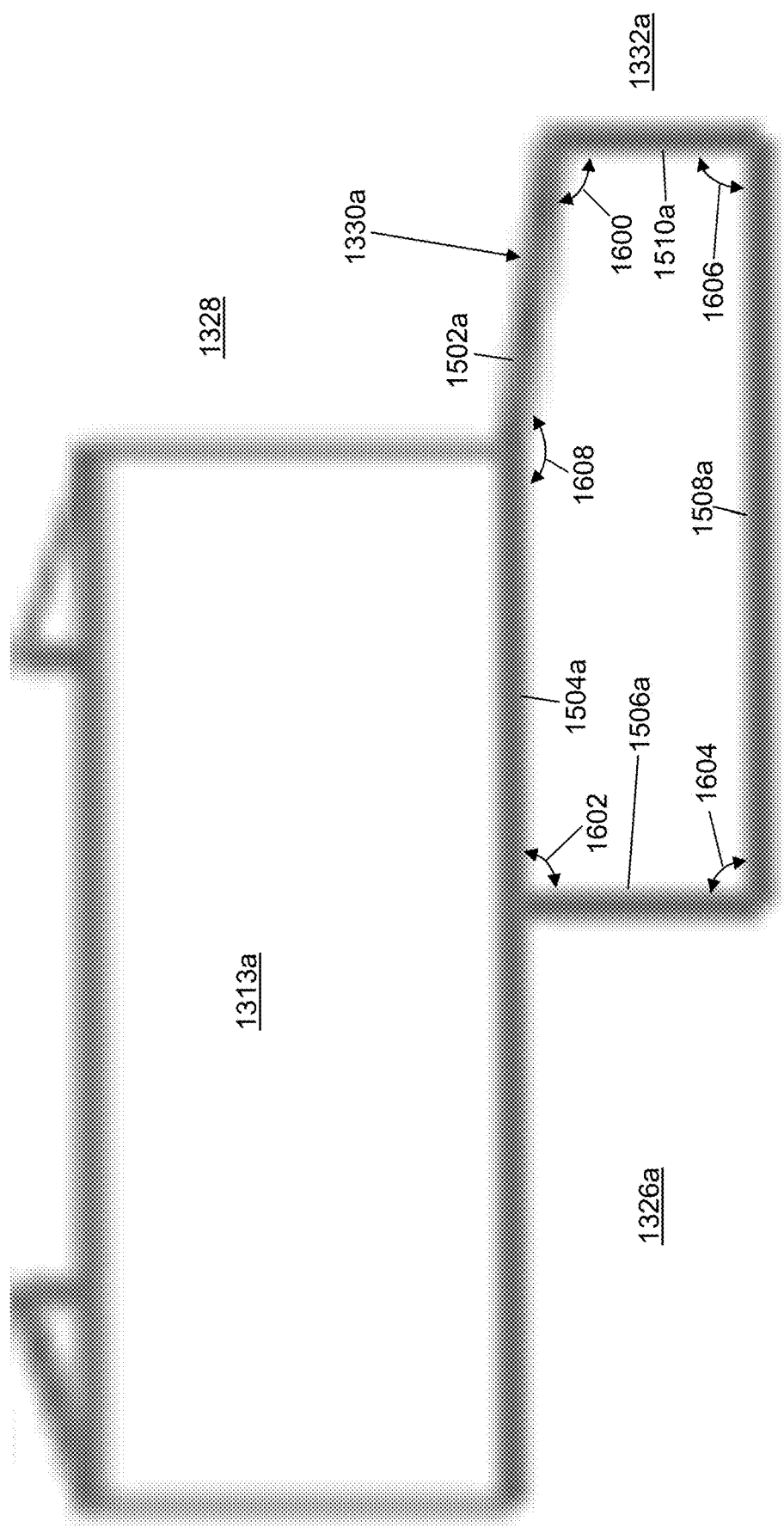
FIG. 16 depicts an air gap and permanent magnet of the rotor of the axial VPPM of FIG. 13 in accordance with an illustrative embodiment.

Referring to FIG. 16, first rotor air gap 1330a and first PM 1313a of axial VPPM 1300 are shown in accordance with an illustrative embodiment. A first angle 1600 is defined between first wall 1502a and fifth wall 1510a. A second angle 1602 is defined between second wall 1504a and third wall 1506a. A third angle 1604 is defined between third wall 1506a and fourth wall 1508a. A fourth angle 1606 is defined between fourth wall 1508a and fifth wall 1510a. A sixth angle 1608 is defined between first wall 1502a and second wall 1504a. In the illustrative embodiment, second angle 1602, third angle 1604, and fourth angle 1606 are equal to ninety degrees. Sixth angle 1608 equals 270 degrees minus first angle 1600. As a result, in the illustrative embodiment, second wall 1502a and fourth wall 1508a are parallel to each other, and third wall 1506a and fifth wall 1110a are parallel to each other. Fifth wall 1510a is perpendicular to fourth wall 1108a, and third wall 1506a is perpendicular to second wall 1502a and fourth wall 1508a. First wall 1502a connects second wall 1504a and fifth wall 1510a.

Second wall length 1512 may be selected as a percentage of width 226 of first PM 1332a. For example, illustrative percentages for second wall length 1512 may be 40% to 80% of width 226 of first PM 1332a. Third wall length 1514 also may be selected as a percentage of width 226 of first PM 1332a. For example, illustrative percentages for third wall length 1514 may be 40% to 80% of width 226 of first PM 1332a. Rib width 1520 may be selected as a percentage of a radius to an inner surface of first rotor 1304 and second rotor 1305. For example, illustrative percentages for rib width 1520 may be 0.3% to 2.5% of the inner radius.

Though second radial, spoke type, VPPM 400, third radial, spoke type, VPPM 1000, and axial VPPM 1300 have been described as Vernier machines the plurality of rotor air gaps 500, the plurality of rotor air gaps 1014, the first plurality of rotor air gaps 1314, and the second plurality of rotor air gaps 1330 could be implemented in a similar manner in electric machines that are not implemented as Vernier machines based on the number of stator pole pairs and the number of rotor pole pairs.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A rotor comprising:
    a first rotor core;
    a plurality of ribs that each extend from the first rotor core;
    a plurality of rotor core teeth that each extend from the first rotor core, wherein a plurality of rotor air gaps are formed in the first rotor core between a rib of the plurality of ribs and a tooth of the plurality of rotor core teeth;
    a second rotor core that extends from the plurality of ribs, from the plurality of rotor core teeth, and from a first wall of each rotor air gap of the plurality of rotor air gaps; and
    a plurality of permanent magnets mounted as spokes in pole pairs within the second rotor core, wherein each permanent magnet of the plurality of permanent magnets is included in only one pole pair of the pole pairs, wherein each pole pair of the pole pairs includes two adjacent permanent magnets of the plurality of permanent magnets;
    wherein a second wall of each rotor air gap of the plurality of rotor air gaps borders a portion of an edge of a permanent magnet of the plurality of permanent magnets, wherein a length of the portion of the edge is greater than 40% and less than 80% of a length of the edge, wherein only one rotor air gap borders each permanent magnet of the plurality of permanent magnets,
    wherein a third wall of each rotor air gap of the plurality of rotor air gaps is formed by a first side of a tooth of the plurality of rotor core teeth,
    wherein a fourth wall of each rotor air gap of the plurality of rotor air gaps is formed by the first rotor core,
    wherein a fifth wall of each rotor air gap of the plurality of rotor air gaps is formed by a first side of a rib of the plurality of ribs,
    wherein the first wall is connected between the second wall and the fifth wall, wherein the third wall is connected between the second wall and the fourth wall, wherein the fourth wall is connected between the third wall and the fifth wall,
    wherein each pole pair of permanent magnets of the plurality of permanent magnets has an associated pair of rotor air gaps of the plurality of rotor air gaps, wherein a first rotor air gap of each pair of rotor air gaps of the plurality of rotor air gaps is a mirror image of a second rotor air gap of each pair of rotor air gaps of the plurality of rotor air gaps, wherein each pair of rotor air gaps of the plurality of rotor air gaps is separated by an associated rib of the plurality of ribs.

2. The rotor of claim 1, wherein the second wall is formed of a first material, wherein the first material has a permeability approximately equal to air.

3. The rotor of claim 1, wherein the first rotor core and the second rotor core have a circular cross section, and the first rotor core is radially interior of the second rotor core.

4. The rotor of claim 1, wherein the first rotor core and the second rotor core have a circular cross section, and the second rotor core is radially interior of the first rotor core.

5. The rotor of claim 1, wherein the first rotor core and the second rotor core have a circular cross section, wherein a first inner radius of the first rotor core is equal to a second inner radius of the second rotor core, wherein the first rotor core is mounted in an axial direction relative to the second rotor core.

6. A rotor comprising:
    a first rotor core;
    a plurality of ribs that each extend from the first rotor core;
    a plurality of rotor core teeth that each extend from the first rotor core, wherein a plurality of rotor air gaps are formed in the first rotor core between a rib of the plurality of ribs and a tooth of the plurality of rotor core teeth;
    a second rotor core that extends from the plurality of ribs, from the plurality of rotor core teeth, and from a first wall of each rotor air gap of the plurality of rotor air gaps; and
    a plurality of permanent magnets mounted as spokes in pole pairs within the second rotor core, wherein each permanent magnet of the plurality of permanent magnets is included in only one pole pair of the pole pairs, wherein each pole pair of the pole pairs includes two adjacent permanent magnets of the plurality of permanent magnets;

wherein a second wall of each rotor air gap of the plurality of rotor air gaps borders an edge of a permanent magnet of the plurality of permanent magnets, wherein a length of the second wall is greater than 40% and less than 80% of a length of the edge, wherein only one rotor air gap borders each permanent magnet of the plurality of permanent magnets, wherein a third wall of each rotor air gap of the plurality of rotor air gaps is formed by a first side of a tooth of the plurality of rotor core teeth, wherein a fourth wall of each rotor air gap of the plurality of rotor air gaps is formed by the first rotor core, wherein a fifth wall of each rotor air gap of the plurality of rotor air gaps is formed by a first side of a rib of the plurality of ribs, wherein the first wall is connected between the second wall and the fifth wall, wherein the third wall is connected between the second wall and the fourth wall, wherein the fourth wall is connected between the third wall and the fifth wall, wherein each pole pair of permanent magnets of the plurality of permanent magnets has an associated pair of rotor air gaps of the plurality of rotor air gaps, wherein a first rotor air gap of each pair of rotor air gaps of the plurality of rotor air gaps is a mirror image of a second rotor air gap of each pair of rotor air gaps of the plurality of rotor air gaps, wherein each pair of rotor air gaps of the plurality of rotor air gaps is separated by an associated rib of the plurality of ribs.

7. The rotor of claim 6, wherein each rotor air gap of the plurality of rotor air gaps is filled with a first material that has a permeability approximately equal to air.

8. The rotor of claim 6, wherein each rotor air gap of the plurality of rotor air gaps is filled with air.

9. The rotor of claim 6, wherein the first rotor core, the plurality of ribs, the plurality of rotor core teeth, and the second rotor core are formed of a continuous piece of ferromagnetic material.

10. The rotor of claim 6, wherein the permanent magnet of the plurality of permanent magnets has a rectangular shape, wherein the third wall is parallel to a side wall of the permanent magnet of the plurality of permanent magnets to which it is associated, wherein the side wall does not include the edge of the permanent magnet.

11. The rotor of claim 6, wherein the first rotor core and the second rotor core have a circular cross section, wherein the fifth wall is parallel to a radial line to a center of the circular cross section.

12. The rotor of claim 6, wherein the first rotor core and the second rotor core have a circular cross section, wherein a first inner radius of the first rotor core is equal to a second inner radius of the second rotor core, wherein the first rotor core is mounted in an axial direction relative to the second rotor core, wherein the third wall and the fifth wall are parallel to each other, wherein the second wall and the fourth wall are parallel to each other.

13. The rotor of claim 6, wherein at least three angles formed between adjacent walls of the first wall, the second wall, the third wall, the fourth wall, and the fifth wall are approximately ninety degrees.

14. The rotor of claim 6, wherein each associated rib is centered between the first wall of the first rotor air gap and the first wall of the second rotor air gap.

15. The rotor of claim 6, wherein a length of the fifth wall is less than a length of the third wall.

16. The rotor of claim 6, wherein a length of the third wall is between 20% and 40% of the length of the edge.

17. The rotor of claim 6, wherein the first rotor core and the second rotor core have a circular cross section, wherein a width of each rib measured perpendicular to the fifth wall is between 0.3% and 2.5% of a radial length of an inner radius of the rotor.

18. An electric machine comprising:
a rotor comprising
a first rotor core;
a plurality of ribs that each extend from the first rotor core;
a plurality of rotor core teeth that each extend from the first rotor core, wherein a plurality of rotor air gaps are formed in the first rotor core between a rib of the plurality of ribs and a tooth of the plurality of rotor core teeth; and
a second rotor core that extends from the plurality of ribs, from the plurality of rotor core teeth, and from a first wall of each rotor air gap of the plurality of rotor air gaps;
a plurality of permanent magnets mounted as spokes in pole pairs within the rotor, wherein each permanent magnet of the plurality of permanent magnets is included in only one pole pair of the pole pairs, wherein each pole pair of the pole pairs includes two adjacent permanent magnets of the plurality of permanent magnets;
a stator comprising a plurality of slots and a plurality of teeth, wherein a slot of the plurality of slots is positioned between a pair of the plurality of teeth, and further wherein the stator is mounted on a first side of the rotor separated by an air gap between a surface of the second rotor core and a tooth of the plurality of teeth; and
a stator winding wound about the stator to form a number of poles between a set of terminals;
wherein a second wall of each rotor air gap of the plurality of rotor air gaps borders a portion of an edge of a permanent magnet of the plurality of permanent magnets, wherein a length of the portion of the edge is greater than 40% and less than 80% of a length of the edge, wherein only one rotor air gap borders each permanent magnet of the plurality of permanent magnets,
wherein a third wall of each rotor air gap of the plurality of rotor air gaps is formed by a first side of a tooth of the plurality of rotor core teeth,
wherein a fourth wall of each rotor air gap of the plurality of rotor air gaps is formed by the first rotor core,
wherein a fifth wall of each rotor air gap of the plurality of rotor air gaps is formed by a first side of a rib of the plurality of ribs,
wherein the first wall is connected between the second wall and the fifth wall, wherein the third wall is connected between the second wall and the fourth wall, wherein the fourth wall is connected between the third wall and the fifth wall,
wherein each pole pair of permanent magnets of the plurality of permanent magnets has an associated pair of rotor air gaps of the plurality of rotor air gaps, wherein a first rotor air gap of each pair of rotor air gaps of the plurality of rotor air gaps is a mirror image of a second rotor air gap of each pair of rotor air gaps of the plurality of rotor air gaps, wherein each pair of rotor air gaps of the plurality of rotor air gaps is separated by an associated rib of the plurality of ribs.

19. The electric machine of claim 18, wherein a number of the pole pairs of the rotor is greater than the number of poles of the stator winding.

20. The electric machine of claim 18, wherein the stator winding is a concentrated winding.

* * * * *

UNITED STATES PATENT AND TRADEMARK OFFICE
CERTIFICATE OF CORRECTION

PATENT NO. : 10,594,179 B2  
APPLICATION NO. : 15/595063  
DATED : March 17, 2020  
INVENTOR(S) : Wenbo Liu et al.

Page 1 of 1

It is certified that error appears in the above-identified patent and that said Letters Patent is hereby corrected as shown below:

In the Specification

Column 5, Line 7:
Delete the phrase "$H_{gap}$ is a volume," and replace with --$V_{gap}$ is a volume,--.

Column 8, Line 59:
Delete the phrase "a twelfth tooth 1121 of the plurality of teeth 112 is labeled." and replace with --a twelfth tooth 112l of the plurality of teeth 112 is labeled.--.

Column 11, Line 21:
Delete the phrase "a twelfth slot bordered by twelfth tooth 1121" and replace with --a twelfth slot bordered by twelfth tooth 112l--.

Column 11, Lines 27-28:
Delete the phrase "the twelfth slot bordered by twelfth tooth 1121" and replace with --the twelfth slot bordered by twelfth tooth 112l--.

Signed and Sealed this  
Ninth Day of June, 2020

Andrei Iancu  
*Director of the United States Patent and Trademark Office*